(12) United States Patent
Ismael et al.

(10) Patent No.: US 9,159,035 B1
(45) Date of Patent: Oct. 13, 2015

(54) FRAMEWORK FOR COMPUTER APPLICATION ANALYSIS OF SENSITIVE INFORMATION TRACKING

(71) Applicant: FireEye, Inc., Milpitas, CA (US)

(72) Inventors: Osman Abdoul Ismael, Palo Alto, CA (US); Dawn Song, San Francisco, CA (US); Phung-Te Ha, Dublin, CA (US); Peter J. Gilbert, Winston Salem, NC (US); Hui Xue, San Jose, CA (US)

(73) Assignee: FireEye, Inc., Milpitas, CA (US)

( * ) Notice: Subject to any disclaimer, the term of this patent is extended or adjusted under 35 U.S.C. 154(b) by 202 days.

(21) Appl. No.: 13/775,170

(22) Filed: Feb. 23, 2013

(51) Int. Cl.
  *G06F 15/18* (2006.01)
  *G06N 99/00* (2010.01)

(52) U.S. Cl.
  CPC .................. *G06N 99/005* (2013.01)

(58) Field of Classification Search
  USPC .......................................................... 706/12
  See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,440,723 A | 8/1995 | Arnold et al. |
| 5,657,473 A | 8/1997 | Killean et al. |
| 5,842,002 A | 11/1998 | Schnurer et al. |
| 5,978,917 A | 11/1999 | Chi |
| 6,088,803 A | 7/2000 | Tso et al. |
| 6,094,677 A | 7/2000 | Capek et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |

(Continued)

FOREIGN PATENT DOCUMENTS

| | | |
|---|---|---|
| GB | 2439806 | 1/2008 |
| WO | WO-02/06928 | 1/2002 |

(Continued)

OTHER PUBLICATIONS

High-performance server systems and the next generation of online games, D'Amora, B.; Nanda, A.; Magerlein, K.; Binstock, A.; Yee, B., IBM Systems Journal Year: 2006, vol. 45, Issue: 1 pp. 103-118, DOI: 10.1147/sj.451.0103.*

(Continued)

*Primary Examiner* — Michael B Holmes
(74) *Attorney, Agent, or Firm* — Rutan & Tucker LLP; William W. Schaal

(57) ABSTRACT

A method is described that involves generating one or more machine learned rules with a machine learning system. The method also involves generating a representation of an application that describes various states and state transitions of the application. The method also involves referring to the one or more machine learned rules and the representation to identify a region of interest of the application. The method also involves configuring one or more monitors for the application to be enabled in a run time environment of the application. The method also involves setting conditions of the application within the run time environment to drive the application's execution to the region of interest. The method also involves observing behaviors of the application and determining whether the region of interest corresponds to improperly behaving code.

33 Claims, 13 Drawing Sheets

(56) References Cited

U.S. PATENT DOCUMENTS

| | | |
|---|---|---|
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,069,316 B1 | 6/2006 | Gryaznov |
| 7,080,408 B1 | 7/2006 | Pak et al. |
| 7,093,002 B2 | 8/2006 | Wolff et al. |
| 7,093,239 B1 | 8/2006 | van der Made |
| 7,100,201 B2 | 8/2006 | Izatt |
| 7,159,149 B2 | 1/2007 | Spiegel et al. |
| 7,231,667 B2 | 6/2007 | Jordan |
| 7,240,364 B1 | 7/2007 | Branscomb et al. |
| 7,240,368 B1 | 7/2007 | Roesch et al. |
| 7,287,278 B2 | 10/2007 | Liang |
| 7,308,716 B2 | 12/2007 | Danford et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,565,550 B2 | 7/2009 | Liang et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,849,506 B1 | 12/2010 | Dansey et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,761 B1 | 5/2011 | Benett |
| 7,996,556 B2 | 8/2011 | Raghavan et al. |
| 7,996,836 B1 | 8/2011 | McCorkendale et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,709 B2 | 7/2012 | Viljoen et al. |
| 8,239,944 B1 | 8/2012 | Nachenberg et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,365,286 B2 | 1/2013 | Poston |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,510,827 B1 | 8/2013 | Leake et al. |
| 8,510,842 B2 | 8/2013 | Amit et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,946 B1 | 10/2013 | Aziz et al. |
| 8,584,094 B2 | 11/2013 | Dahdia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 * | 3/2014 | Xue et al. ............... 382/131 |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,782,792 B1 | 7/2014 | Bodke |
| 8,793,787 B2 * | 7/2014 | Ismael et al. ............... 726/22 |
| 8,805,947 B1 | 8/2014 | Kuzkin et al. |
| 8,806,647 B1 | 8/2014 | Daswani et al. |
| 9,009,822 B1 * | 4/2015 | Ismael et al. ............... 726/22 |
| 9,009,823 B1 * | 4/2015 | Ismael et al. ............... 726/22 |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0144156 A1 | 10/2002 | Copeland, III |
| 2002/0162015 A1 | 10/2002 | Tang |
| 2002/0166063 A1 | 11/2002 | Lachman et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0115483 A1 | 6/2003 | Liang |
| 2003/0188190 A1 | 10/2003 | Aaron et al. |
| 2003/0200460 A1 | 10/2003 | Morota et al. |
| 2003/0208744 A1 | 11/2003 | Amir et al. |
| 2003/0212902 A1 | 11/2003 | Van Der Made |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0093513 A1 | 5/2004 | Cantrell et al. |
| 2004/0111531 A1 | 6/2004 | Staniford et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |

(56) References Cited

U.S. PATENT DOCUMENTS

| | | |
|---|---|---|
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0114663 A1 | 5/2005 | Cornell et al. |
| 2005/0125195 A1 | 6/2005 | Brendel |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0265331 A1 | 12/2005 | Stolfo |
| 2006/0010495 A1 | 1/2006 | Cohen et al. |
| 2006/0015715 A1 | 1/2006 | Anderson |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0271446 A1 | 11/2007 | Nakamura |
| 2008/0005782 A1 | 1/2008 | Aziz |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0320556 A1 | 12/2008 | Lee et al. |
| 2008/0320594 A1 | 12/2008 | Jiang |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0044024 A1 | 2/2009 | Oberheide et al. |
| 2009/0044274 A1 | 2/2009 | Budko et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0158430 A1 | 6/2009 | Borders |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1* | 7/2010 | Ismael et al. .................... 726/22 |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0025504 A1 | 2/2011 | Lyon et al. |
| 2011/0041179 A1 | 2/2011 | Stahlberg |
| 2011/0047594 A1 | 2/2011 | Mahaffey et al. |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0167494 A1 | 7/2011 | Bowen et al. |
| 2011/0219449 A1 | 9/2011 | St. Neitzel et al. |
| 2011/0247072 A1 | 10/2011 | Staniford et al. |
| 2011/0265182 A1 | 10/2011 | Peinado et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0117652 A1 | 5/2012 | Manni et al. |

(56) References Cited

U.S. PATENT DOCUMENTS

| | | | |
|---|---|---|---|
| 2012/0121154 A1* | 5/2012 | Xue et al. | 382/131 |
| 2012/0174186 A1 | 7/2012 | Aziz et al. | |
| 2012/0174218 A1 | 7/2012 | McCoy et al. | |
| 2012/0198279 A1 | 8/2012 | Schroeder | |
| 2012/0210423 A1 | 8/2012 | Friedrichs et al. | |
| 2012/0222121 A1 | 8/2012 | Staniford et al. | |
| 2012/0255015 A1 | 10/2012 | Sahita et al. | |
| 2012/0266244 A1 | 10/2012 | Green et al. | |
| 2012/0278886 A1 | 11/2012 | Luna | |
| 2012/0297489 A1 | 11/2012 | Dequevy | |
| 2012/0330801 A1 | 12/2012 | McDougal et al. | |
| 2013/0036472 A1 | 2/2013 | Aziz | |
| 2013/0047257 A1 | 2/2013 | Aziz | |
| 2013/0086684 A1 | 4/2013 | Mohler | |
| 2013/0097706 A1 | 4/2013 | Titonis et al. | |
| 2013/0117855 A1 | 5/2013 | Kim et al. | |
| 2013/0160130 A1 | 6/2013 | Mendelev et al. | |
| 2013/0160131 A1 | 6/2013 | Madou et al. | |
| 2013/0185798 A1 | 7/2013 | Saunders et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2014/0053260 A1 | 2/2014 | Gupta et al. | |
| 2014/0053261 A1 | 2/2014 | Gupta et al. | |
| 2014/0179360 A1* | 6/2014 | Jackson et al. | 455/466 |
| 2014/0337836 A1* | 11/2014 | Ismael | 718/1 |
| 2015/0096025 A1* | 4/2015 | Ismael | 726/23 |

FOREIGN PATENT DOCUMENTS

| | | |
|---|---|---|
| WO | WO-02/23805 | 3/2002 |
| WO | WO-2007-117636 | 10/2007 |
| WO | WO-2008/041950 | 4/2008 |
| WO | WO-2011/084431 | 7/2011 |
| WO | WO-2012145066 | 10/2012 |

OTHER PUBLICATIONS

Use of Role Based Access Control for Security-Purpose Hypervisors, Hirano, M.; Chadwick, D.W.; Yamaguchi, S. Trust, Security and Privacy in Computing and Communications (TrustCom), 2013 12th IEEE International Conference on Year: 2013 pp. 1613-1619, DOI: 10.1109/TrustCom.2013.199.*

Towards Understanding Malware Behaviour by the Extraction of API Calls, Alazab, M.; Venkataraman, S.; Watters, P. Cybercrime and Trustworthy Computing Workshop (CTC), 2010 Second Year: 2010 pp. 52-59, DOI: 10.1109/CTC.2010.8.*

IEEE Xplore Digital Library Sear Results for "detection of unknown computer worms". Http//ieeexplore.ieee.org/searchresult.jsp?SortField=Score&SortOrder=desc&ResultC . . . , (Accessed on Aug. 28, 2009).

AltaVista Advanced Search Results. "Event Orchestrator". Http://www.altavista.com/web/results?ltag=ody&pg=aq&aqmode=aqa=Event+Orchestrator . . . , (Accessed on Sep. 3, 2009).

AltaVista Advanced Search Results. "attack vector identifier". Http://www.altavista.com/web/results?ltag=ody&pg=aq&aqmode=aqa=Event+Orchestrator . . . , (Accessed on Sep. 15, 2009).

Cisco, *Configuring the Catalyst Switched Port Analyzer (SPAN)* ("Cisco"), (1992-2003).

Reiner Sailer, Enriquillo Valdez, Trent Jaeger, Roonald Perez, Leendert van Doorn, John Linwood Griffin, Stefan Berger., *sHype: Secure Hypervisor Appraoch to Trusted Virtualized Systems* (Feb. 2, 2005) ("Sailer").

Excerpt regarding First Printing Date for Merike Kaeo, *Designing Network Security* ("Kaeo"), (2005).

*The Sniffers's Guide to Raw Traffic* available at: yuba.stanford.edu/~cascado/pcap/section1.html, (Jan. 6, 2014).

"Network Security: NetDetector—Network Intrusion Forensic System (NIFS) Whitepaper", ("*NetDetector Whitepaper*"), (2003).

"Packet", *Microsoft Computer Dictionary*, Microsoft Press, (Mar. 2002), 1 page.

"When Virtual is Better Than Real", *IEEEXplore Digital Library*, available at, http://ieeexplore.ieee.org/xpl/articleDetails.jsp?reload=true&arnumber=990073, (Dec. 7, 2013).

Abdullah, et al., *Visualizing Network Data for Intrusion Detection*, 2005 IEEE Workshop on Information Assurance and Security, pp. 100-108.

Adetoye, Adedayo , et al., "Network Intrusion Detection & Response System", ("Adetoye"), (Sep. 2003).

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", *J Comput Virol*, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", *International Conference on Emerging Networking Experiments and Technologies, Proceedings of the 2005 ACM Conference on Emerging Network Experiment and Technology*, CoNEXT '05, Toulousse, France, (Oct. 2005), pp. 71-82.

Cohen, M.I. , "PyFlag—An advanced network forensic framework", *Digital investigation 5*, Elsevier, (2008), pp. S112-S120.

Costa, M. , et al., "Vigilante: End-to-End Containment of Internet Worms", *SOSP '05*, Association for Computing Machinery, Inc., Brighton U.K., (Oct. 23-26, 2005).

Crandall, J.R. , et al., "Minos:Control Data Attack Prevention Orthogonal to Memory Model", *37th International Symposium on Microarchitecture*, Portland, Oregon, (Dec. 2004).

Deutsch, P. , ""Zlib compressed data format specification version 3.3" RFC 1950, (1996)".

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", *Proceeding of the 5th Symposium on Operating Systems Design and Implementation*, USENIX Association, ("Dunlap"), (Dec. 9, 2002).

Filiol, Eric , et al., "Combinatorial Optimisation of Worm Propagation on an Unknown Network", International Journal of Computer Science 2.2 (2007).

Goel, et al., *Reconstructing System State for Intrusion Analysis*, Apr. 2008 *SIGOPS Operating Systems Review*, vol. 42 Issue 3, pp. 21-28.

Hjelmvik, Erik , "Passive Network Security Analysis with NetworkMiner", *(In)Secure*, Issue 18, (Oct. 2008), pp. 1-100.

Kaeo, Merike , "Designing Network Security", ("Kaeo"), (Nov. 2003).

Kim, H. , et al., "Autograph: Toward Automated, Distributed Worm Signature Detection", *Proceedings of the 13th Usenix Security Symposium (Security 2004)*, San Diego, (Aug. 2004), pp. 271-286.

King Samuel T., et al., "Operating System Support for Virtual Machines", ("King").

Krasnyansky, Max , et al., *Universal TUN/TAP driver*, available at https://kernel.org/doc/Documentation/networking/tuntap.txt (2002) ("Krasnyansky").

Kreibich, C. , et al., "Honeycomb-Creating Intrusion Detection Signatures Using Honeypots", *2nd Workshop on Hot Topics in Networks (HotNets-11)*, Boston, USA, (2003).

Kristoff, J. , "Botnets, Detection and Mitigation: DNS-Based Techniques", *NU Security Day*, (2005), 23 pages.

Liljenstam, Michael , et al., "Simulating Realistic Network Traffic for Worm Warning System Design and Testing", Institute for Security Technology studies, Dartmouth College, ("Liljenstam"), (Oct. 27, 2003).

Marchette, David J., "Computer Intrusion Detection and Network Monitoring: A Statistical Viewpoint", ("Marchette"), (2001).

Margolis, P.E. , "Random House Webster's 'Computer & Internet Dictionary 3rd Edition'", ISBN 0375703519, (Dec. 1998).

(56) References Cited

OTHER PUBLICATIONS

Moore, D., et al., "Internet Quarantine: Requirements for Containing Self-Propagating Code", *INFOCOM*, vol. 3, (Mar. 30-Apr. 3, 2003), pp. 1901-1910.

Morales, Jose A., et al., ""Analyzing and exploiting network behaviors of malware."", *Security and Privacy in Communication Networks*. Springer Berlin Heidelberg, 2010. 20-34.

Natvig, Kurt, "SANDBOXII: Internet", *Virus Bulletin Conference*, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In *Proceedings of the 12th Annual Network and Distributed System Security, Symposium (NDSS '05)*, (Feb. 2005).

Newsome, J., et al., "Polygraph: Automatically Generating Signatures for Polymorphic Worms", In *Proceedings of the IEEE Symposium on Security and Privacy*, (May 2005).

Nojiri, D., et al., "Cooperation Response Strategies for Large Scale Attack Mitigation", *DARPA Information Survivability Conference and Exposition*, vol. 1, (Apr. 22-24, 2003), pp. 293-302.

Peter M. Chen, and Brian D. Noble, "When Virtual is Better Than Real, Department of Electrical Engineering and Computer Science", University of Michigan ("Chen").

Silicon Defense, "Worm Containment in the Internal Network", (Mar. 2003), pp. 1-25.

Singh, S., et al., "Automated Worm Fingerprinting", *Proceedings of the ACM/USENIX Symposium on Operating System Design and Implementation*, San Francisco, California, (Dec. 2004).

Spitzner, Lance, "Honeypots: Tracking Hackers", ("Spizner"), (Sep. 17, 2002).

Thomas H. Ptacek, and Timothy N. Newsham, "Insertion, Evasion, and Denial of Service: Eluding Network Intrusion Detection", *Secure Networks*, ("Ptacek"), (Jan. 1998).

Venezia, Paul, "NetDetector Captures Intrusions", *InfoWorld* Issue 27, ("Venezia"), (Jul. 14, 2003).

Whyte, et al., "DNS-Based Detection of Scanning Works in an Enterprise Network", *Proceedings of the 12th Annual Network and Distributed System Security Symposium*, (Feb. 2005), 15 pages.

Williamson, Matthew M., "Throttling Viruses: Restricting Propagation to Defeat Malicious Mobile Code", *ACSAC Conference*, Las Vegas, NV, USA, (Dec. 2002), pp. 1-9.

Li et al., A VMM-Based System Call Interposition Framework for Program Monitoring, Dec. 2010, IEEE 16th International Conference on Parallel and Distributed Systems, pp. 706-711.

U.S. Appl. No. 13/775,169, Non Final Office Action, mailed Mar. 12, 2014.

U.S. Appl. No. 13/775,169, Notice of Allowance, mailed Jan. 13, 2015.

U.S. Appl. No. 13/775,172, Final Office Action, mailed Dec. 9, 2014.

U.S. Appl. No. 13/775,171, Final Office Action, mailed Dec. 12, 2014.

U.S. Appl. No. 13/775,166, Final Office Action, mailed Oct. 22, 2014.

U.S. Appl. No. 13/775,166, Non Final Office Action, mailed Mar. 21, 2014.

U.S. Appl. No. 13/775,171, Non Final Office Action, mailed Mar. 27, 2014.

U.S. Appl. No. 13/775,172, Non Final Office Action, mailed Apr. 22, 2014.

U.S. Appl. No. 13/775,166, Notice of Allowance, mailed Jan. 29, 2015.

U.S. Appl. No. 13/775,168, Final Office Action, mailed Nov. 14, 2014.

U.S. Appl. No. 13/775,168, Non Final Office Action, mailed Mar. 16, 2015.

U.S. Appl. No. 13/775,168, Non Final Office Action, mailed Jun. 13, 2014.

U.S. Appl. No. 13/775,171 filed Feb. 23, 2013, Non-Final Office Action, dated Aug. 5, 2015.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Hu, Cuixiong, and Lulian Neamtiu. "Automating GUI testing for Android applications." Proceedings of the 6th International Workshop on Automation of Software Test. ACM, 2011.

Gilbert, Peter, et al. "Vision: automated security validation of mobile apps at app markets." Proceedings of the second international workshop on Mobile cloud computing and services. ACM, 2011.

\* cited by examiner

FRAMEWORK FOR COMPUTER APPLICATION ANALYSIS OF SENSITIVE INFORMATION TRACKING

FIELD OF INVENTION

The field of invention pertains generally to computing systems and, more specifically, to a framework for efficient security coverage of mobile software applications using machine learning.

BACKGROUND

With the emergence of mobile and/or handheld computing, e.g., as embodied by the prevalence of tablet computers and smart phones, the security of the application software that runs on these devices has become a matter of concern. The concern is becoming particularly acute as more powerful mobile platforms are supporting more capable and important application software applications. With increased capability and importance the applications and underlying platforms are handling more sensitive information more intensively.

BRIEF DESCRIPTION OF THE DRAWINGS

The invention will be more fully understood with reference to the following detailed description in conjunction with the drawings, of which.

DETAILED DESCRIPTION

Figure 1:
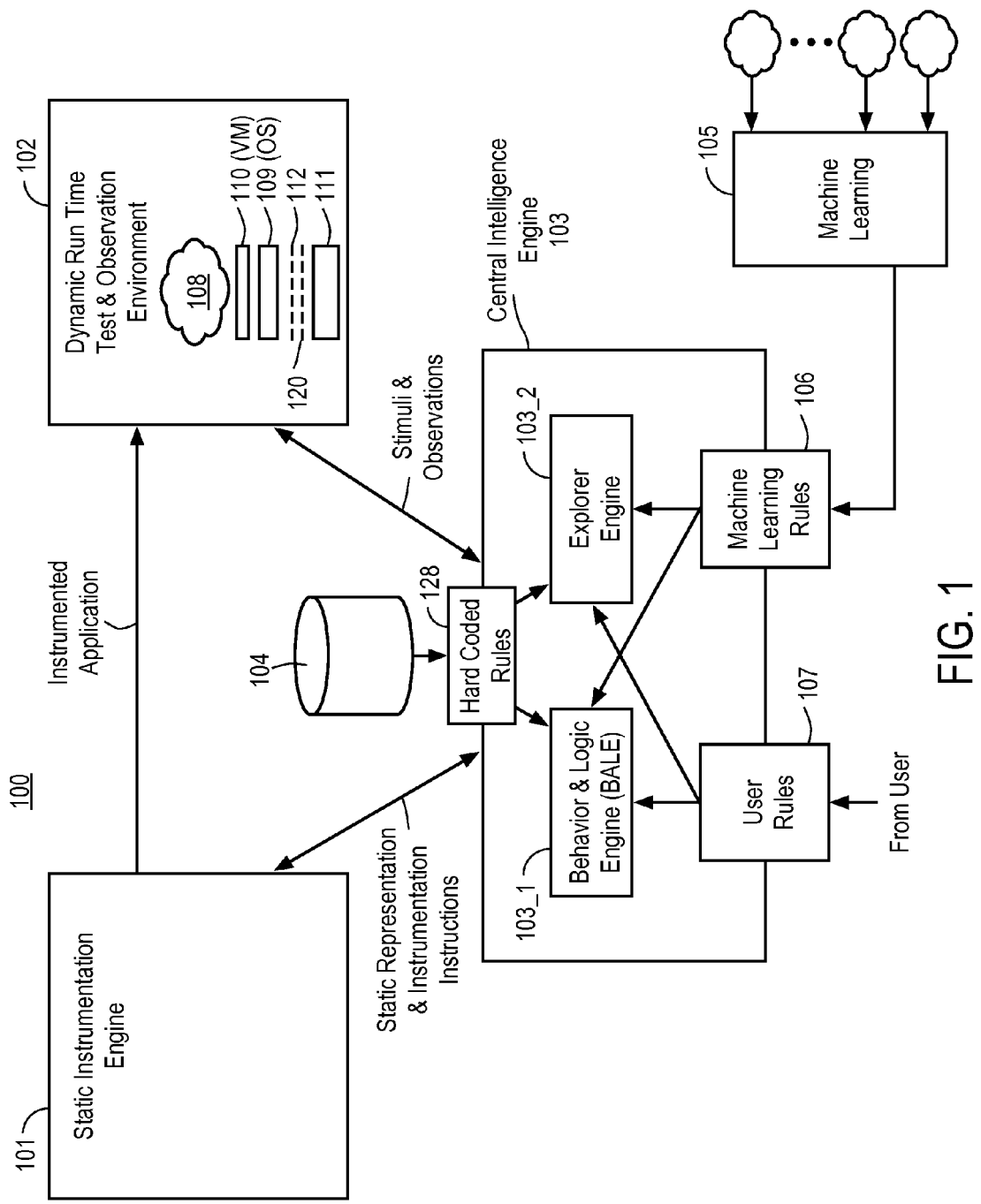
FIG. 1 shows a framework for efficiently determining whether an application is safe or unsafe.

FIG. 1 shows a high level depiction of a framework 100 for testing the safety/security of application software including mobile device application software. As observed in FIG. 1, the framework includes: 1) a static instrumentation engine 101; 2) a dynamic run time test and observation environment 102; 3) a central intelligence engine 103 that includes a behavior and logic engine 103_1 and an explorer engine 103_2; 3) a platform-specific knowledge base 104 and "hard coded" rules provided therefrom 128; 4) a machine learning platform 105 and associated rules generated therefrom 106; and, 5) customer or user provided rules 107.

The central intelligence engine 103 controls the testing strategy of an application under test 108 that is executing within the dynamic runtime environment 102. Essentially, the central intelligence engine 103 identifies "regions of interest" within the code of the application 108, determines specific stimuli to reach these regions of interest, causes such stimuli to be applied to the application 108, monitors the behavior of the application 108 in response to these stimuli and determines whether or not the application is "safe" or "unsafe" in view of the application's observed behavior.

As observed in FIG. 1, the central intelligence engine 103 includes a behavior and logic engine (BALE) 103_1 and an explorer engine 103_2. The behavior and logic engine 103_1 observes the application 108 to ultimately reach a conclusion, in view of its observations, whether or not the application 108 is "safe". The behavior and logic engine 103_1 in response to its observations and in pursuit of its ultimate objective of determining whether or not the application is safe, may identify stimuli to be applied to the application, identify specific monitoring functions that should be enabled to detect certain application behaviors and/or identify possible "regions of interest" that may exist in the application based on its observed behavior and notify the explorer engine 103_2 of such possible regions of interest.

The explorer engine 103_2 assists the behavior and logic engine by "studying" the internal structure and operation of the application 108 looking for and identifying "regions of interest" within the application code (i.e., portions of the code that correspond to unsafe operations as opposed to benign/safe operations). Besides being notified of the possibility that certain regions of interest may exist in the application based on the behavior and logic engine's 103_1 observations of the application's behavior, the explorer engine 103_2 may also look for certain kinds of "regions of interest" based on one or more rules provided by the user, one or more rules gleaned from a machine learning platform and/or one or more "hard-coded" rules. Subsequent applied stimuli and observations of the application 108 are focused on the identified regions of interest. By focusing the stimuli and observations on the regions of interest the overall testing and characterization of the application is more streamlined and efficient because execution of large portions of benign application code is largely avoided.

According to one approach, the behavior and logic engine 103_1 is implemented as an inference engine. As is understood in the art, an inference engine recursively collects information ("facts") describing the current state of a system under observance and matches them against applicable "rules" for the system. "Acts" are defined for specific patterns/sets of facts that match the applicable rules. The set of available acts for a particular set of matching facts and rules corresponds to an "agenda". The engine then performs "conflict resolution" which is the process of determining which acts from the "agenda" should be performed (the "conflict set") and in what order they should be performed in. After conflict resolution, the selected acts are then performed on the system in the determined order (here, the conflict set may define a next set of stimuli to be applied to the application). The acts generate a new state of the system being observed, which corresponds to the generation of new facts. The process described above then repeats in a recursive fashion until some conclusion about the system is reached. That is, the engine's recursive conflict resolution actions are generally aimed at reaching some conclusion about the system (in this case, ideally, whether the application software is "safe" or "unsafe").

The explorer engine 103_2 analyzes a control flow graph or other representation of the application's internal structure/operation that defines different states of the application and the stimuli needed to cause a transition from one particular application state to another particular application state (including multiple transitions through multiple states). In an embodiment, the representation of the application that is analyzed by the explorer engine 103_2 is generated by the static instrumentation engine 101 with one or more various software analysis techniques (e.g., control flow analysis, data flow analysis, value set analysis, event analysis, etc.). The explorer engine 103_2, e.g., through reference to various rules that describe appropriate and/or inappropriate code structures and/or code, and/or by way of notification from the behavior and logic engine 103_1 that certain inappropriate code structures and/or code may exist in the application based on its observed behavior, identifies "regions of interest" within the representation of the application. The explorer engine 103_2 then attempts to identify specific stimuli that may be applied to the application to cause it to transition to an identified region of interest.

The corpus of rules available to the behavior and logic and explorer engines 103_1, 103_2 are provided from: i) rules 128 provided from the platform specific knowledge base 104; ii) rules 106 generated from a machine learning platform 105; and, iii) customer/user provided rules 107. More discussion concerning the use of these rules is provided in more detail further below.

The run-time test engine and observation environment 102 includes the application software being observed 108 and an instance 109 of the type of operating system the application is expected to later run-on if ultimately deemed safe. In various embodiments, the run-time test environment 102 may include a first virtual machine 110 between the application under test 108 and the operating system instance 109. Here, the application software 108 is typically received as abstract executable code (e.g., Java byte code) or other CPU hardware agnostic code. The first virtual machine 110 converts the application's generic executable code into appropriate instructions for the underlying hardware platform 111. The first virtual machine 110 and application under test 108 can together be referred to as a "process".

The operating system instance 109 may also run on a second virtual machine 112 that itself runs on a virtual machine monitor (VMM) layer 120 that exists between the second virtual machine 112 and hardware platform 111.

Figure 2:
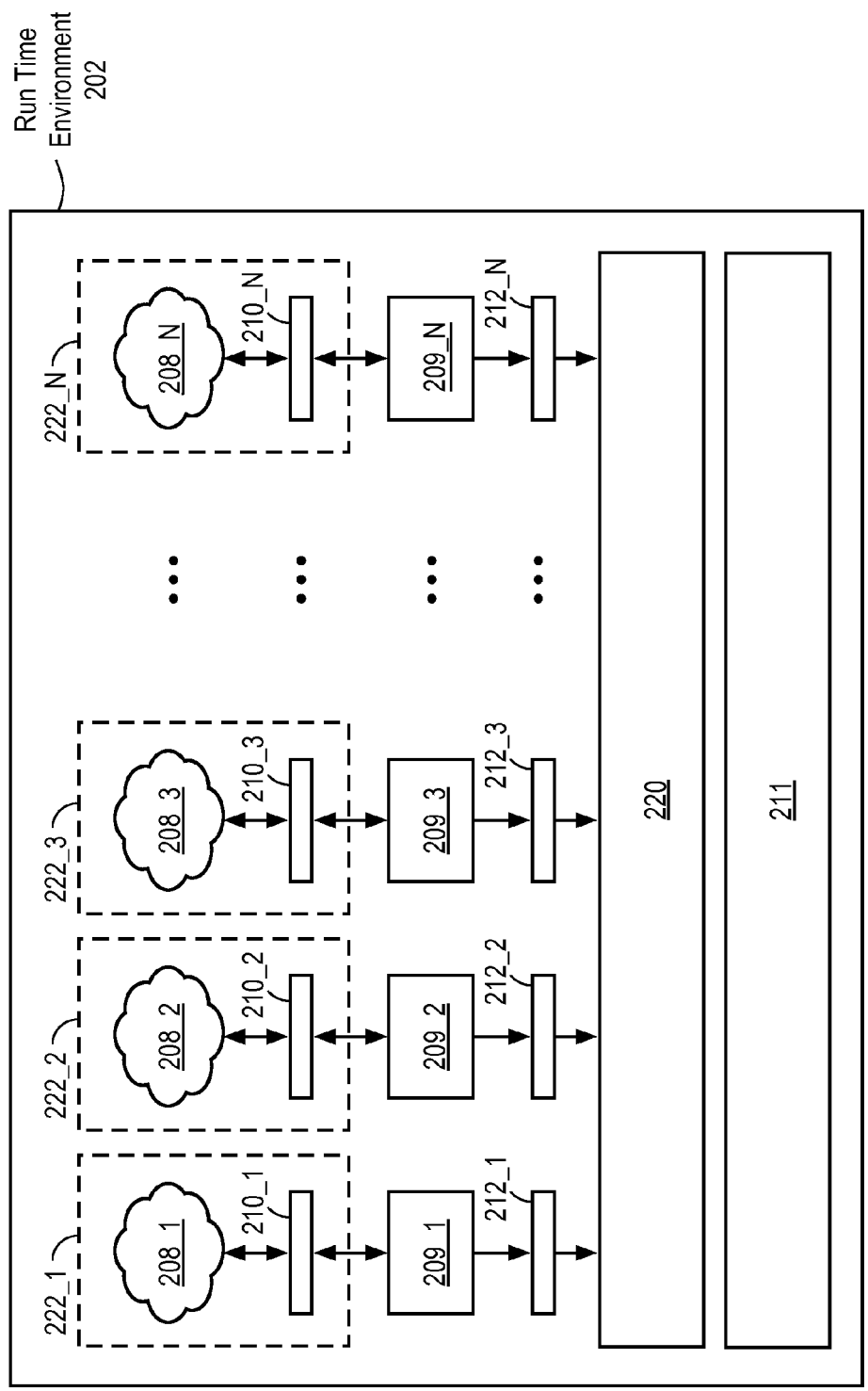
FIG. 2 shows a first embodiment of a run-time environment.

FIG. 2 shows a more detailed embodiment of the run time environment 202. Notably, there are multiple "second" virtual machines 212_1 through 212_N running on the VMM layer 220, where, each second virtual machine 212_1 through 212_N supports its own respective operating system instance 209_1 through 209_N. In turn, each operating system instance 209_1 through 209_N supports its own respective "first" virtual machine 210_1 through 210_N and application instance 208_1 through 208_N under observance.

As is known in the art, a VMM layer 220 is responsible for partitioning/allocating the resources of the underlying hardware platform 211 (e.g., system memory, CPU threads, non volatile storage space, etc.) amongst the various second virtual machines 212_1 through 212_N. Essentially, each of the second virtual machines 212_1 through 212_N attempts to present the image of an entire computing system and its resources to its respective operating system instance 209_1 through 209_N. The VMM layer 220 and its virtual machines 212_1 through 212_N largely hide from the operating system instances 109_1 through 109_N the perspective that they are actually sharing a single underlying computing system 211.

The existence of multiple second virtual machines 212_1 through 212_N essentially permits the instantiation of multiple run time test processes 222_1 through 222_N that are isolated from one another. The concurrent existence of multiple, isolated run time test processes 222_1 through 222_N permits different types of coverage and observation sequences to be concurrently run on a single application.

That is, different instances of the same application may be provided in different run time processes so that different types of coverage and observance sequences can be concurrently performed on the same application. Alternatively or in combination, different applications can be concurrently observed in the multiple run-time processes. For instance, a first application may be observed in a first run time test process (e.g., process 222_1) while a second, different application is observed in a second run time test process (e.g., process 222_2). The second different application may be a different version of the first or a different application entirely.

Additionally, instances of different operating system types may support different run time processes. For example, an ANDROID operating system instance may support a first run time process while an iOS operating system instance may support a second run time process. Elsewise, different versions of same operating instance may concurrently execute on a virtual machine monitor layer to support two different run time processes. Concurrent testing of multiple application instances (whether different instances of the same application or respective instances of different applications or different versions of a same application or some combination thereof) enhances the overall performance of the system.

The central intelligence engine 103, returning to FIG. 1, is therefore capable of concurrently analyzing multiple application instances. This includes maintaining parallel inference engine recursions and internal analyses of the multiple application instances. In cases where multiple instances of a same application are being concurrently tested, communications/information sharing may exist amongst the testing schemes of the two or more of the application instances to help formulate a single global "multi-threaded" testing strategy for the application. For simplicity, the remainder of the application largely refers to a single run time test process.

Figure 3:
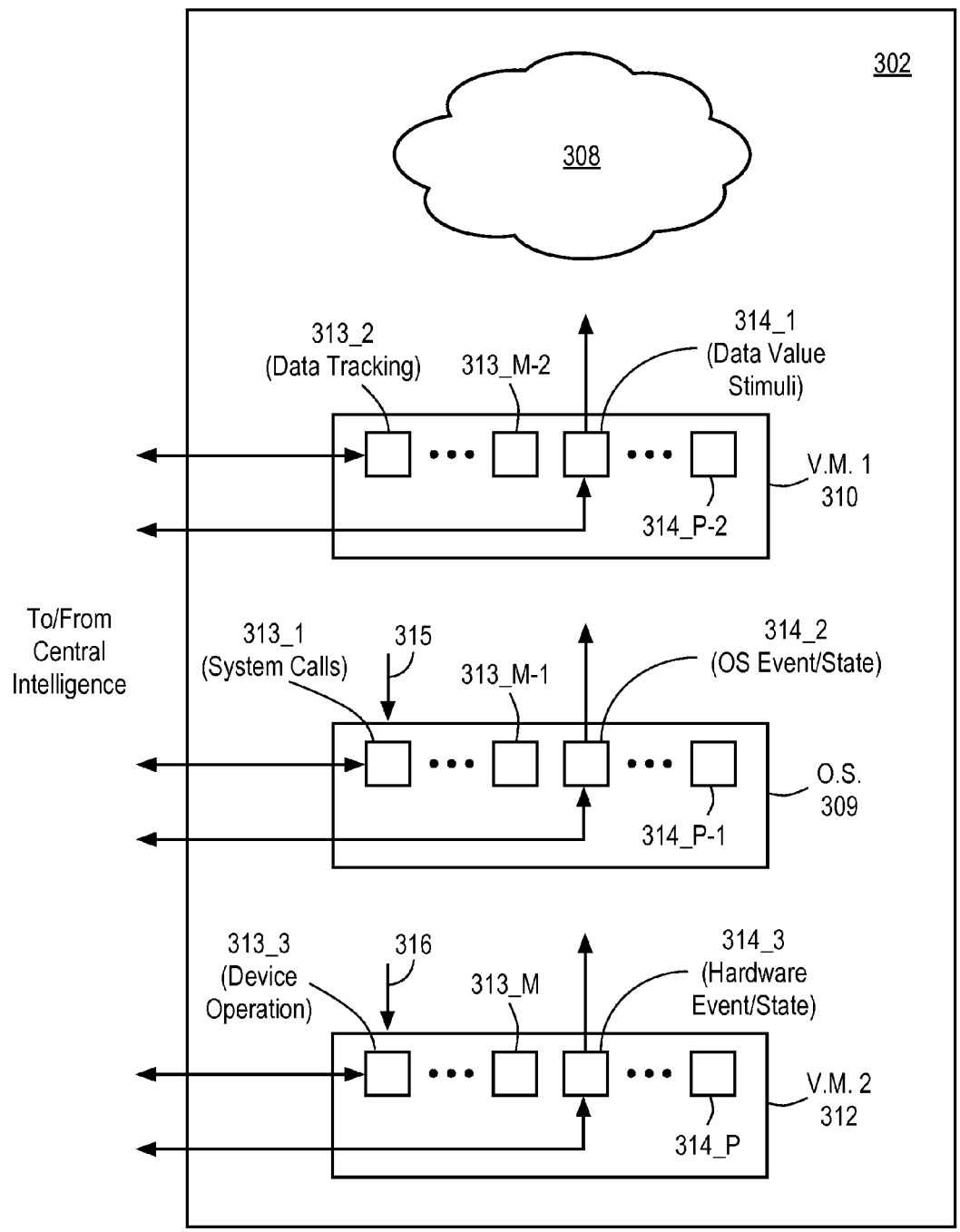
FIG. 3 shows a second embodiment of a run-time environment.

FIG. 3 shows a more detailed view of a single run time environment 302. In an embodiment, each run time process 222_1 through 222_N of FIG. 2 and associated operating system instances 209_1 through 209_N and second virtual machines 212_1 through 212_N may include the different components illustrated in FIG. 3. As observed in FIG. 3, and as discussed above, the run time environment 302 includes an instance of an application being observed 308, a first virtual machine 310, an operating system instance 309, and a second virtual machine 312. For simplicity the VMM layer and hardware platform is not shown.

Here, each of the first virtual machine 310, the operating system instance 309 and the second virtual machine 312 is retrofitted with various monitoring functions 313_1 through 313_M that the central intelligence engine 103 is able to enable/disable. For example, the central intelligence engine 103 may enable certain monitoring functions (e.g., monitoring functions 313_1 and 313_3) while disabling the remaining monitoring functions (e.g., functions 313_2 and 313_4 (not shown) through 313_M). In an embodiment, the monitoring functions at least include: i) a system calls monitoring function 313_1; ii) a data tracking monitoring function 313_2; and, iii) a device operation monitoring function 313_3.

As observed in FIG. 3, the system calls monitoring function 313_1 is embedded in the operating system instance 309, the data tracking monitoring function 313_2 is embedded in the first virtual machine 310 and the device operation monitoring function is embedded in the second virtual machine 312. Notably, these monitoring function locations are exemplary as they could likewise be located in different locations.

For example, the data tracking monitoring function 313_2 could be located in the second virtual machine 312 and the system call monitoring function 313_1 could be located in the first virtual machine 310.

The system calls monitoring function 313_1 monitors the run time execution of the application's executable code and flags any system calls. Here, a system call is essentially any invocation 315 of the underlying operating system instance 309 made by the application under test 308 or its virtual machine 310. As is understood in the art, an operating system provides services for basic uses of the hardware platform. An application's request to use such a service corresponds to a system call. The types of system calls an application can make typically include process control system calls (e.g., load, execute, create process, terminate process, wait (e.g., for an event), allocate or free a system memory range), file management system calls (e.g., create/delete file, open/close file, get/set file attributes), information maintenance system calls (e.g., get/set time or date) and I/O system calls such as communication system calls (e.g., create/delete network connection, send/receive messages, attach/detach remote devices) and user interface operating system (OS) calls.

In order to flag any system calls made by the application 308 or virtual machine 310, in an embodiment, monitoring function 313_1 detects a system call (such as any of or a masked subset of any of the system calls mentioned above) and reports the event to the central intelligence engine 103 along with any parameters associated with the call. For example, if an application seeks to open a network connection to a particular network address, the system call monitoring function 313_1 will report both the request to open the connection and the network address to the central intelligence engine 103. The monitoring function may intercept system calls by "hooking" the system calls to capture the passed parameter.

The data tracking monitoring function 313_2 tracks specific items of data within the application 308. As is understood by those of ordinary skill, data is usually identified by the memory location and/or register location where it is stored. The executable code of an application 308 specifically calls out and identifies these locations. Frequently, data will move from one memory/register location to another. The data tracking monitoring function 313_2 tracks the movement of a specific item of data and reports any suspicious activity to the central intelligence engine 103. More specifically, in an embodiment, the data tracking monitoring function 313_2 is provided with the identity of a specific "sensitive" (e.g., highly confidential) data item, and, reports to the central intelligence engine any attempt by the application to cause the data to be directed out of the run time environment (such as attempting to send the data over a network connection), or, stored in a file or other storage (e.g., register and/or memory) location other than an approved location.

In an embodiment, the data tracking monitoring function 313_2 maintains internal tables having an entry for register and system memory addresses referred to by the application code. Each entry also identifies whether its corresponding register/memory address is "tainted". The data tracking monitoring function 313_2 marks as tainted any register/ memory location where the sensitive information is kept. Additionally, the data tracking monitoring function 313_2 marks as tainted any register or memory location to which a tainted register/memory location's content is moved. The data tracking monitoring function 313_2 will also clear a tainted register/memory location (i.e., mark it as no longer tainted) if it is overwritten with the contents of a non-tainted register/memory location or is otherwise erased (e.g., by being reset to cleared to all zeroes).

By so doing, all locations where the sensitive information resides are known. Any attempt by the application 308 to direct data from a tainted location outside the run time environment 302 or to an "unapproved" register, memory or file location is reported to the central intelligence engine 103. The report includes pertinent ancillary information associated with the attempt (such as the network address to where a data transmission was attempted, or the unapproved file location where an attempted store was made). In the case of unapproved network destinations and/or storage locations, the data tracking monitoring function 313_2 is informed beforehand of at least one of the data item's approved or unapproved data destinations/locations by the central intelligence engine 103. In many cases, the identity of the sensitive information to the central intelligence engine 103 is made by way of the user provided rules 107.

The device operation monitoring function 313_3 monitors calls 316 made by the application 308 or virtual machine 310 to the underlying hardware platform directly (i.e., not through an OS system call). Here, a "device" is generally understood to be any attachment or peripheral (attachments/peripherals are typically coupled to a hardware system's I/O control hub (ICH) or system memory control hub (MCH)). Attachments/ peripherals typically include non volatile storage devices (e.g., disk drives, SSD devices), network interfaces (e.g., SMS functions, HTTP functions), keyboards, displays and mouse/touchpad/control stick devices, integrated camera devices, integrated audio devices (both input (e.g., microphone) and output (e.g., speaker system) and printers among other possible devices. In the context of the device monitoring function 313_3, however, the term "device" is understood to be broader than just peripherals. For example, if an application attempts to directly write to control register space (such as model specific register space) of a CPU core or a memory controller within the hardware platform the device operation monitoring function 313_3 will track these operations as well.

Here, depending on system implementation, various devices within the underlying hardware may be manipulated by the application 308 or virtual machine 310 through direct communication to the underlying hardware without involvement of the operating system (e.g., by writing to the underlying platform's register space). These operations are tracked by the device operation monitoring function 313_3. By contrast, the application's behavior with respect to those devices or functions called thereon that are not directly communicated to the hardware are typically manipulated through the operating system 309. These calls are therefore tracked with the system call monitoring function 313_1.

When a call is made to a device directly through the hardware, the device operation monitoring function 313_3 reports the call to the central intelligence engine 103 identifying both the targeted device and the type of call that was made.

As mentioned above, in one approach, a monitoring function will not monitor and/or report out an event it is designed to detect unless it is specifically enabled (e.g., by the central intelligence engine 103) beforehand.

In many cases the application instance 308 is a mobile application that is effected with abstract executable code (e.g., Java bytecode) that needs to be converted into the object code of a particular type of CPU by the first virtual machine 310. In cases where the application instance 308 is provided as object code that is already targeted for a specific CPU type (i.e., the first virtual machine 310 is not needed) the monitoring functions 313_1 to 313_M may nevertheless be integrated into the run time environment so as observe the interface between the application 308 and the operating system instance 309. For example, as stated earlier, the data tracking monitoring function 313_2 can be integrated into the second virtual machine 312 instead.

Along with the monitoring functions 313_1 through 313_M, stimuli functions 314_1 through 314_P are also integrated into the run time environment 302. Whereas the monitoring functions 313_1 through 313_M are designed to report observed behaviors of the application 308 to the central intelligence engine 103, by contrast, the stimuli functions 314_1 through 314_P are designed to apply specific input values and/or signals to the application 308 (e.g., to drive the application's execution to a region of interest, to observe the application's behavioral response to these inputs, etc.). The specific input values and/or signals to be applied are provided by the central intelligence engine 103.

As observed in FIG. 3, the stimuli functions include: i) a data value stimuli function 314_1; ii) as OS event/state stimuli function 314_2; and, iii) a hardware event/state stimuli function 314_3.

The data value stimuli function 314_1 is able to set specific low level data values of the application's code. The data value may be specific data that is processed by the application or control data used to control the application. For example, the data value stimuli function 314_1 may be used to set an instruction pointer to a specific value to begin or jump application execution to a specific point in the application's code. Likewise, the data value stimuli function 314_1 may be used to create/change/delete any data value within the register or system memory space that is processed by the application 308. This capability may be used, for instance, to change the state of the application 308 to any particular state so the application's behavior in response to the artificially set state can be observed.

The OS event/state stimuli function 314_2 is used to create any event that the OS might report to the application 308 (e.g., incoming call, incoming packet, etc.) or present any OS state that is observable to the application 308 (e.g., such as the state of various devices within the system). Here, the OS event/state stimuli 314_2 is essentially used to manipulate the OS portion of the application's environment. Likewise, the hardware event/state stimuli function 314_3 is used to create any event that the hardware might report to the application 308 (e.g., an incoming call for an SMS device that does not communicate to the application through the OS, etc.) or present any state of the hardware observable to the application 308 (e.g., such as the state of various control registers within the system). Here, the hardware event/state stimuli 314_3 is essentially used to manipulate the hardware portion of the application's environment.

Whereas the run time environment has standard monitoring and stimuli functions embedded in the software platform beneath the application under test, the static instrumentation engine 101, returning to FIG. 1, by contrast, modifies the application code itself to include within itself special monitoring functions and/or special stimuli functions. The monitoring functions report their results to the central intelligence engine 103 and the stimuli functions are told what stimuli to generate by the central intelligence engine 103. As such, the static instrumentation engine 101 adds additional monitoring and stimuli functions to the application apart from the monitoring/stimuli functions that are embedded in the application's underlying platform.

Notably, mobile applications written for ANDROID® of Google, Inc. as well as applications written in Java® (whether mobile or desktop) conform very well to the framework outlined in FIG. 3 because they are normally executed with a first virtual machine 310 (e.g., a DALVIK® virtual machine for ANDROID®, a Java® Virtual Machine for Java). Applications written for iOS® from Apple, Inc. include an operative layer between the application and operating system ("objective C runtime in iOS") that dynamically converts abstract code to a lower level code and therefore can be regarded as a first virtual machine for purposes of the present discussion.

Other applications, e.g., for other systems, may not normally use an available first virtual machine. In one approach, applications that normally use an available first virtual machine are stimulated/monitored in the dynamic runtime environment with one or more functions (e.g., functions 313_1 and 313_M-2 among others) being embedded in the first virtual machine level 310, whereas applications that are not normally written to run on an available first virtual machine level (e.g., an application that has been compiled to run on its underlying hardware CPU) may have these monitoring functions embedded in the underlying OS instance 309 or second virtual machine level 310 of the run time environment 302. Alternatively one or more of these stimulation/monitoring functions may be statically added to the applications themselves by the static instrumentation engine 101 of FIG. 1. In the case of applications received in an encrypted form (e.g., at least some iOS applications), static instrumentation may not be an option.

Figure 4:
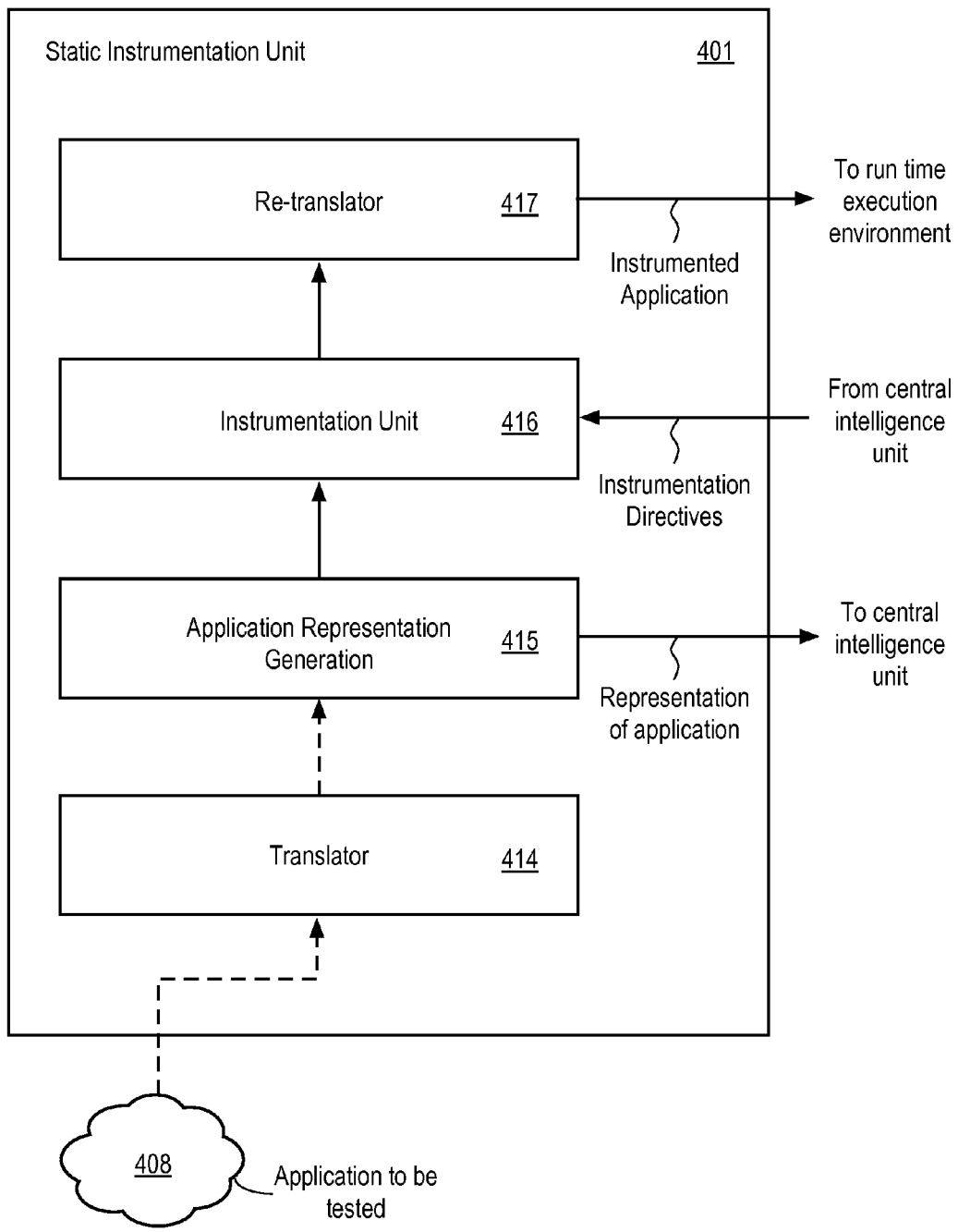
FIG. 4 shows an embodiment of a static instrumentation unit.

FIG. 4 shows an embodiment 401 of the static instrumentation engine 101 of FIG. 1. As observed in FIG. 4, the static instrumentation engine 401 includes an application translator 414, an application representation generation unit 415; an instrumentation unit 416 and an application re-translator 417.

According to one embodiment of the process flow of the static instrumentation engine 401, an application to be observed 408 is provided to the translator 414 in a first low level form (e.g., DALVIK .dex executable code). The translator 414 translates the executable/object code up to a higher more abstract code level (e.g., in the case of .dex, a .dex application is translated up to a RISC-like version of Java byte code which contemplates fewer instructions in the instruction set architecture than pure Java byte code). The higher level code representation of the application is then provided to the application representation generation unit 415 which studies the application's internal structures, code flows, etc. to generate a representation of the application, such as a control flow graph, that defines specific states of the application and various stimuli needed to cause a transition from one application state to another application state. The representation of the application is then provided to the explorer component 103_2 of the central intelligence engine 103.

The explorer portion 103_2 of the central intelligence engine 103 analyzes the application representation to identify what parts of the application may correspond to improperly behaving code (a "region of interest" within the code), and, what set of stimuli are needed to reach that code and activate it. Identification of a region of interest may be based on any of the user provided rules, machine learned rules, hard-coded rules or observations made by the behavior and logic engine 103_1 that are reported to the explorer 103_2. In an embodiment, one or more of, the identities of the types of regions of interest found in the application, the types of stimuli needed to reach such code and the types of stimuli that might activate it are shared with the behavior and logic engine 103_1. The behavior and logic engine 103_1 utilizes this information to establish a next set of acts/stimuli to be performed on the application (e.g., a next "conflict set") and establish, e.g., at least partially, specific behaviors of the application to be monitored.

As part of the definition of the next set of stimuli to be generated and/or next set of behaviors to be monitored, certain ones of the run time environment monitoring and/or stimuli functions 313_1 to 313_M, 314_1 to 314_P of FIG. 3 may be enabled or disabled. Additionally, certain already existing monitoring and/or stimuli functions within the application itself may be enabled or disabled. Further still, certain monitoring and/or stimuli functions that do not exist in the application but should be are also identified. In the later situation, the application needs to be instrumented with additional code that corresponds to the desired monitoring and/or stimuli functions. Notably, typically, not all recursions of the behavior and logic engine 103_1 will necessarily require fresh instrumentation of the application. In those cases where instrumentation of the application is deemed appropriate, however, the central intelligence component 103 communicates which specific monitoring and/or stimuli functions need to be instrumented in the application.

In response, the instrumentation unit 414 instruments the abstracted/translated version of the application's code with the desired monitoring and/or stimuli functions. In cases where the application has already been instrumented with other static monitoring/stimuli functions, in an embodiment, the application's state within the run time environment 102 (e.g., specific data values) is externally saved outside the application and the application is returned to the static instrumentation engine 401. The static instrumentation engine 401 retranslates the application with the translator unit 414 and then instruments it with the new monitoring/stimuli functions with the instrumentation unit 416. The retranslator 417 retranslates the newly instrumented code to a lower level of code and provides it to the run time environment 102. The previously saved application state information is reloaded into the application.

In one embodiment, a new application that has not yet entered the run time environment is instrumented with default static monitoring/stimuli functions. In this case, the new application is retranslated with translator 414, a representation of the new application is generated with representation generation unit 415 and presented to the explorer engine, the explorer engine 103_2 identifies where the default static monitoring/stimuli functions should be placed in the translated application's code structure and communicates these locations to the instrumentation unit 416, the instrumentation unit 416 instruments the translated application at the identified location(s), the re-translation unit 417 retranslates the statically instrumented application to a lower level code, and, the lower level code instance of the instrumented application is sent to the run time environment.

In an embodiment, the application instrumentation unit 416 can embed any of a system calls monitoring function, a data tracking monitoring function and a device operation monitoring function (as discussed above with respect to FIG. 3) into the program code of an application. Again, this approach may be particularly useful if the application does not normally run on a first virtual machine level. Likewise, the application instrumentation unit 416 can embed any of a data value stimulus function, an OS event/state stimulus function and a hardware event/state stimulus function (also as described above with respect to FIG. 3) into the application instead of relying on such functions existing within the software platform beneath the application within the run time environment.

Moreover, in an embodiment, the application instrumentation unit 416 can implement two additional types of monitoring/stimulation into an application. The additional types of monitoring include: i) dynamic load monitoring; and, ii) application API call/event monitoring. The additional stimuli function includes application API call stimulation.

In the case of dynamic load monitoring, the application is modified to track the effects of any code that the application dynamically loads. Here, as is understood in the art, an application may not initially include all of the code that it could execute. Instead, the application includes references to network and/or file locations containing additional code that the application will "load" under certain circumstances (such as the application needs to execute it). An application typically executes the code it dynamically loads.

In the case of dynamic load monitoring, the explorer engine 103_2 of the central intelligence unit 103 analyses the representation of the application's internal structures/flows looking for program code constructs that correspond to dynamic code loading. In a typical circumstance, the application refers to dynamically loaded code with a character string. As such, simplistically, the explorer unit 103_2 looks for a character string associated with a dynamic load operation and causes the application instrumentation unit 415 to add monitoring code into the application that will detect if the string is invoked as a dynamic load reference as well as monitor the behavior of any code that is dynamically loaded from the string and subsequently executed.

The instrumented monitoring code is also configured to report pertinent observations to the central intelligence engine 103. Such observations include whether code has been dynamically loaded; where dynamically loaded code was loaded from; whether dynamically loaded code is being (or has been) executed; and various behaviors of the executing code. The reported behaviors can include any of the behaviors described above with respect to the system call, data tracking and device monitoring functions (whether tracked within the application or beneath it).

In the case of application API call/event monitoring, the instrumentation code that is inserted into the application monitors calls made to the application during runtime and/or events or other "output" generated from the API. Here, as is known in the art, an application is "used" by making a call to the application's application programming interface (API) (e.g., by a user acting through a graphical user interface (GUI)). The API call/event monitoring function detects such calls/events/output and reports them to the central intelligence engine 103. Here, the application itself may contain improperly behaving code that artificially invokes the application's API.

For example, the improperly behaving code may artificially generate application API related actions to cause the application to believe a user is invoking the application for a specific use. The application API call monitoring function would detect any calls made to the API and report them. Knowing what precise user inputs were actually generated, if any, the central intelligence unit 103 could determine that the API calls are malicious.

The application API stimulation function provides stimuli to the application through its API. Here, the central intelligence engine can ask the application to perform certain tasks it was designed to perform. By logging the stimuli applied to the application by way of the application API stimulation function and comparing these stimuli to reports received from the application API tracking function, the central intelligence unit 103 will be able to detect any API invocations made by malicious code. That is, any detected API call that was not purposefully stimulated by the API stimulation function may be the act of malicious code.

Figure 5:
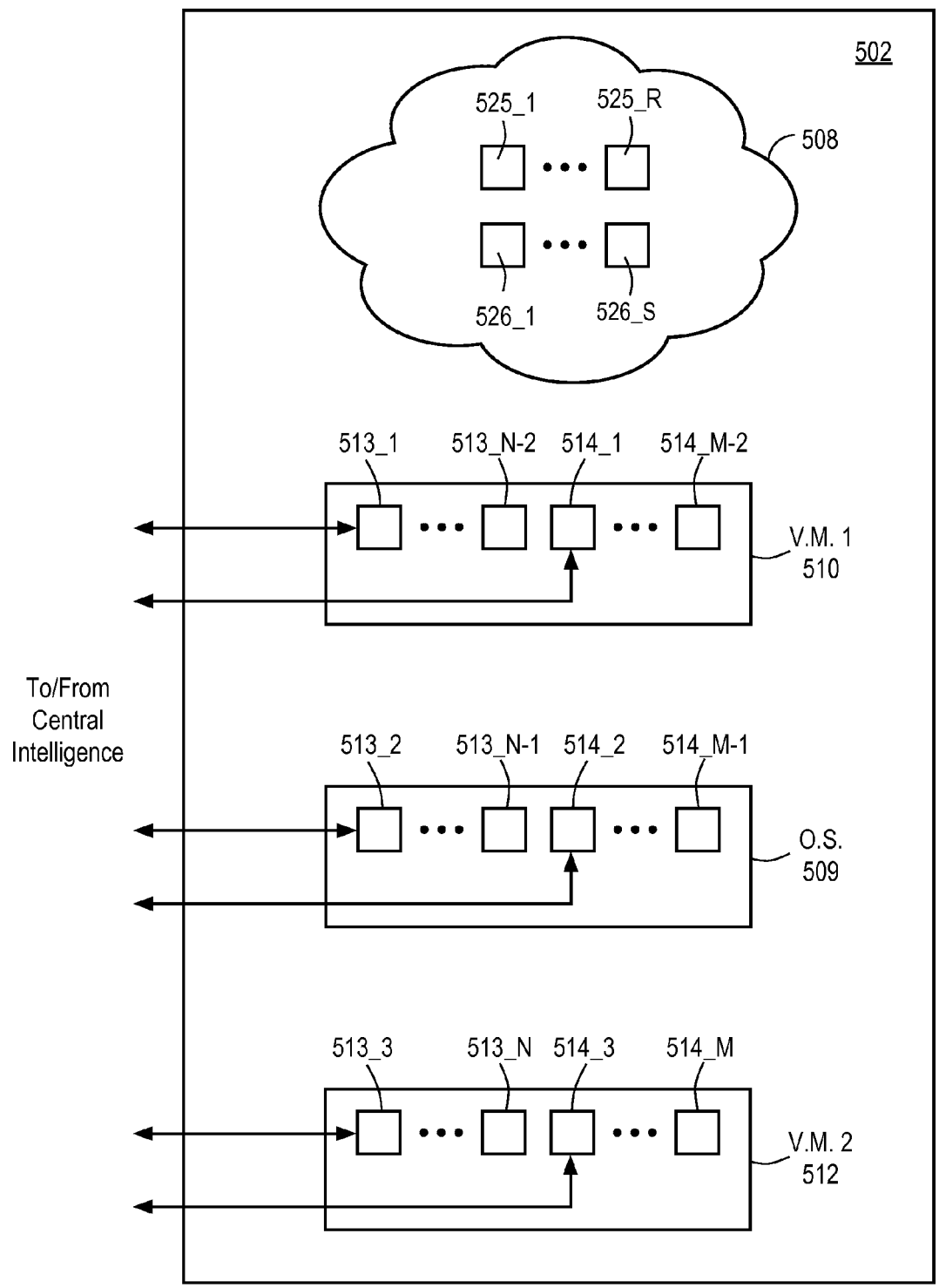
FIG. 5 shows a third embodiment of a run time environment.

FIG. 5 shows another embodiment of the run time environment 502 enhanced to include monitoring functions 525_1 to 525_R and stimuli functions 526_1 through 526_S within the application 508. Here as observed in FIG. 5, it is not uncommon to execute within the runtime environment an application 508 that has been instrumented by the static instrumentation engine 101 with one or more monitoring functions 525_1 to 525_R and/or stimuli functions 526_1 through 526_S, where, the application is running in a run time environment that itself has been enhanced to include monitoring functions 513_1 to 513_N and stimulating functions 514_1 to 514_M. FIG. 5 shows multiple monitoring and stimuli functions at each level (application, first virtual machine 510, OS instance 509 and second virtual machine 512). Although such an arrangement is possible, in various inference engine recursions, one or no monitoring and/or stimuli function may be present at any level.

Figure 6:
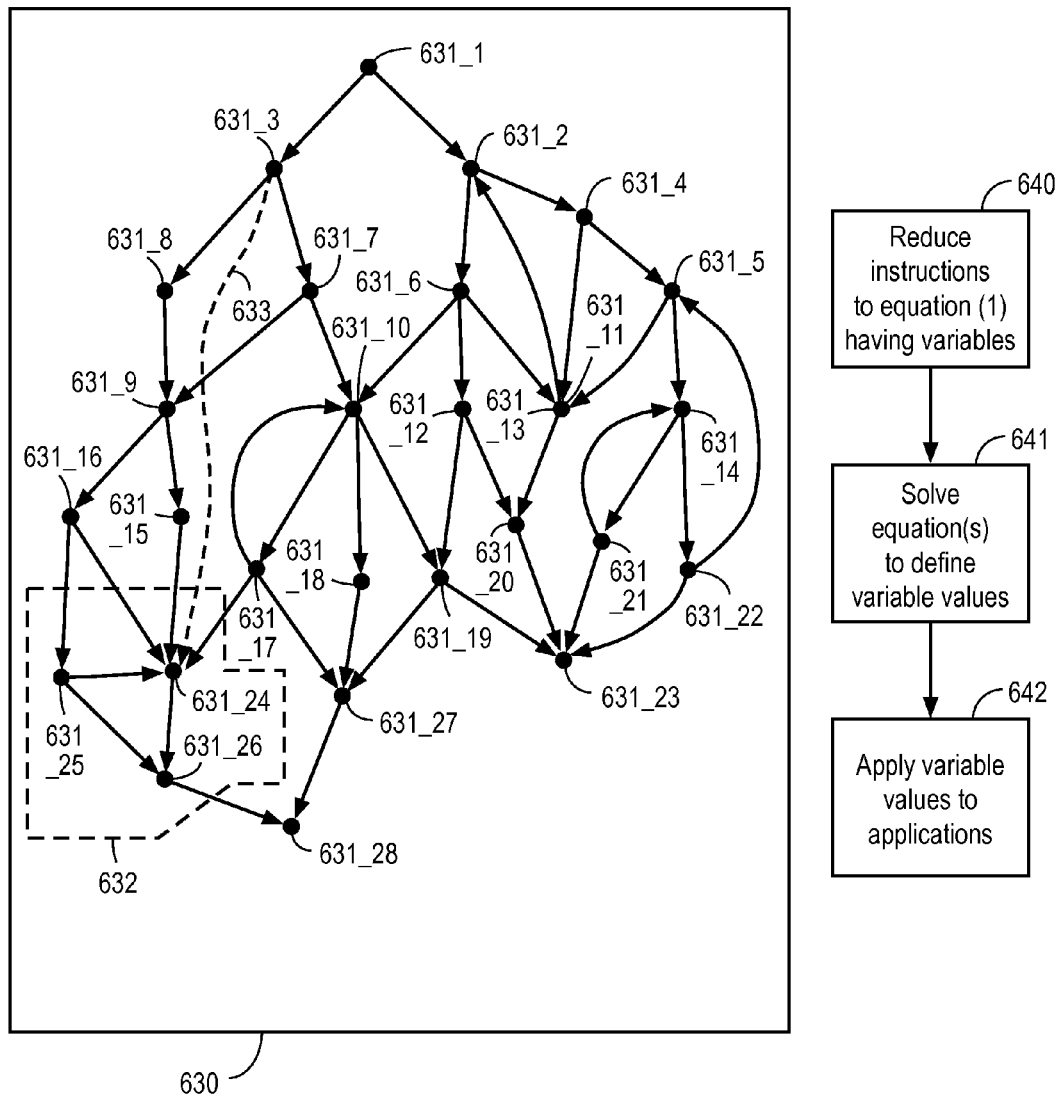
FIG. 6 shows an example of an explorer component's operation.

FIG. 6 provides a more detailed explanation of the operation of the explorer component 103_2 of the central intelligence engine 103. As explained above, the explorer function receives a representation 630 of the application that describes the application's different states 631_1 to 631_28 and various input stimuli needed to transition the application from one state to another state. Each state typically has an associated "basic block" of the application's instructions that ends with a branch of some kind (e.g., conditional branches, unconditional jumps, etc.). Thus, the stimuli needed to transition from a first state to a second state corresponds to the specific data values processed by the first state' basic block that will cause a program branch to the second state. In reality, depending on implementation, the representation 630 as received from the application representation unit may not contain a description of all or even any stimuli needed to cause a particular state transition.

The explorer component therefore: i) identifies sections of the application's code that are "of interest"; ii) identifies paths through the application's code that can be used to reach a particular region of interest within the code; and, iii) identifies input stimuli that may be necessary to trigger one or more state transitions of the application along any such paths to the identified code regions of interest.

In performing these tasks, the explorer is provided with monitored information from one or more of the above described monitor functions within the run time environment. The reports from the monitoring functions permit the explorer to identify the application's current state. For example, based on the reported monitor information, the explorer may determine that the application is currently within state 631_3. Notably, in order to receive this monitored information the explorer may have previously requested (e.g., for a previous inference engine recursion) that certain monitors be enabled and/or that certain previously non-existent static monitors be embedded in the application. Further still, the explorer may have requested such a particular set of monitors because the explorer could not identify the application's state and needed to add the additional monitoring capability to determine it.

With the application's current state eventually recognized at state 613_3, the explorer is next able to identify a section of the application's code as being "of interest". In the present example, assume the explorer identifies code region 632 as being "of interest." Here, the ability to identify a section of code as being of interest may be derived from any of the aforementioned rules. For example, the aforementioned user provided rules 107 may identify an item of data as being particularly sensitive. In this case, the explorer might recognize that basic blocks of code region 632 are written to process or otherwise use this item of data. As another example, which may work in combination with the aforementioned example, the aforementioned machine learning rules 106 and/or platform specific rules 128 may identify a specific combination of states and associated basic blocks that correspond to the operation of improperly behaving code. Additionally or in the alternative, the behavior and logic engine 103_1 may determine that, based on its observations of the application, that it may contain certain types of improperly performing code and notify the explorer component of these determinations. In response the explorer engine can look for corresponding region(s) of interest. That is, the explorer component can look for code structure(s)/profile(s) that correspond to the type(s) of improper code identified by the behavior and logic engine 103_1.

With a region of interest 632 having been identified, the explorer next begins the process of determining a path 633 through the code from the current state 631_3 to the region of interest 632. The exemplary path 633 of FIG. 6 essentially corresponds to the proper sequence of state transitions from state 631_3 to state 631_24. As such, the explorer attempts to understand and then cause the creation of the set of stimuli that will help cause this sequence of state transitions to transpire.

According to one approach, referred to as symbolic execution, the explorer reduces each basic block of each state to one or more logical expressions and their associated variables 640. Here, ultimately, each of the instructions of a basic block can be expressed as a logical axiom of some kind. The logical axioms of the basic block's instructions can be combined to form one or more logical expressions that express the processing of the basic block as a function of the data values (now expressed as variables) that are processed. The expression(s) are presented to a solver 641 which determines whether a "solution" exists to the expression(s) and, if so, what the constraints are. Here, typically, the constraints correspond to limited ranges of the variables/data values that are processed by the basic block's instructions.

Thus, at this point, the explorer has reduced the application's data values to specific limited combinations thereof that have the potential to cause the application to transition to a desired state. In an embodiment, the explorer causes these solutions to be crafted as appropriate input stimuli to input stimuli embedded in the run time environment 642. Conceivably, certain input stimuli functions will need to be enabled or instrumented into the application. Eventually, e.g., through a limited trial-and-error approach, the specific set of variables that lead to the correct state transition are realized. Repeating the process for each state eventually leads program execution to the region of interest 632.

Through these kinds of processes the explorer is able to efficiently direct program execution to regions of interest.

Upon reaching a region of interest, the monitors within the runtime environment are set to observe the kinds of behaviors that will help determine whether the region of interest corresponds to improperly behaving code or not. Here, the behavior and logic engine 103_1 receives the reported information from the monitors and can begin the process of determining whether the region of interest corresponds to improper behavior.

Thus, in this fashion, the explorer 103_2 is able to efficiently bring the application to various regions of interest and the behavior and logic engine 103_1 can determine whether the regions of interest correspond to improperly behaving code. Here, thorough examination of the application can be achieved by repeatedly using the explorer 103_2 to bring the application to a "next" region of interest and the behavior and logic engine 103_1 to characterize the next region of interest. That is, the overall behavior of the central intelligence 103 can be somewhat recursive in nature where the explorer engine 103_2 repeatedly identifies respective regions of interest and what is needed to bring the code's execution to the region of interest. The explorer engine 103_2 and/or behavior and logic engine 103_1 then instrument and/or enable appropriate monitors and bring the application's execution state to the region of interest. The behavior and logic engine then receives the monitoring data and executes a series of inference engine recursions to reach a conclusion about the region of interest and/or application. The overall process then repeats with the explorer engine 103_2 identifying a next region of interest. Throughout the process the explorer engine may also receive reported information from various monitors so it can determine/confirm the present state of the application.

Notably, in an embodiment, comprehending the application's state includes the explorer engine 103_2 maintaining the state of the application's GUI so it can determine how the GUI triggers certain application acts to be performed (e.g., the application representation utilized by the explorer engine 103_2 provides information that links specific GUI feature activations to specific processes performed by the application). With this information the explorer engine 103_2 can set input conditions that effectively "use" the GUI to bring the application's state to (or at least closer to) a desired region of interest within the application. Additionally, the explorer engine, e.g., with reference to applicable rules and behavior and logic engine notifications, detects the presence of possible improper behaving code. Here, certain types of improperly behaving code will attempt to trigger processes of an application by "pretending" to be a user that is using the application through the GUI. That is, improperly behaving code within the application (or external code that is in communication with) will attempt to cause certain application actions by accessing various GUI triggers.

Apart from just the GUI, more generally, the explorer engine, e.g., by reference to particular rules, may also identify improper "low-level" application behavior (such as any improper state transition). This detected behavior can likewise be reported to the behavior and logic engine 103_1 which incorporates this information into a following inference engine recursion.

Figure 7:
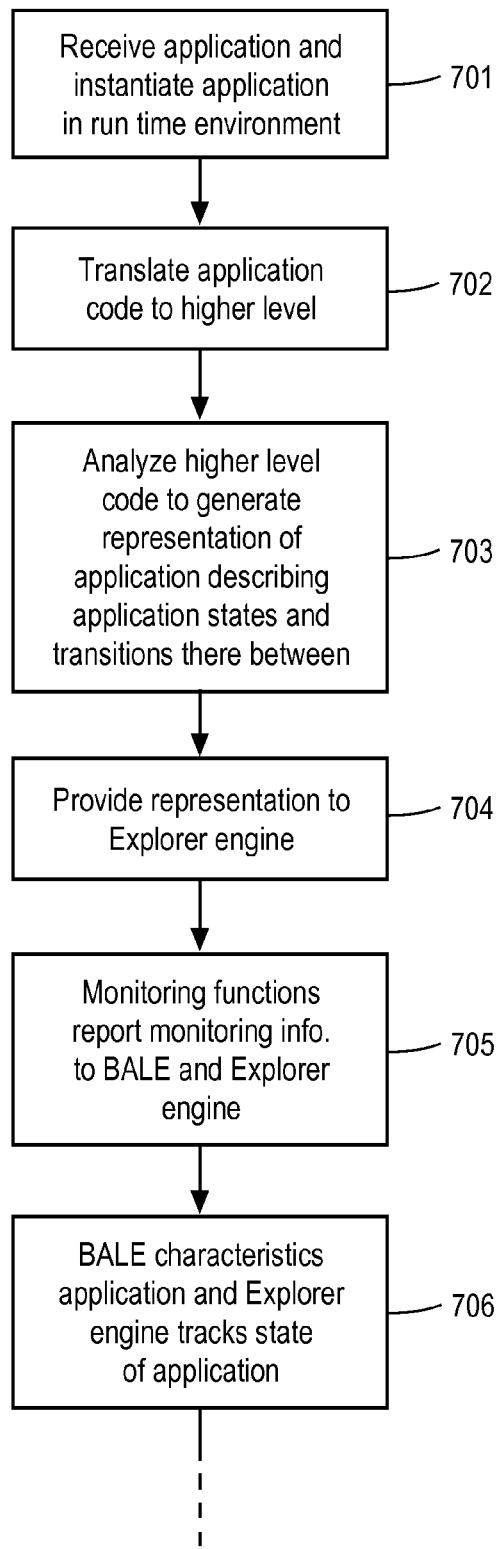
FIG. 7 shows a methodology for the framework of FIG. 1.
Figure 7:
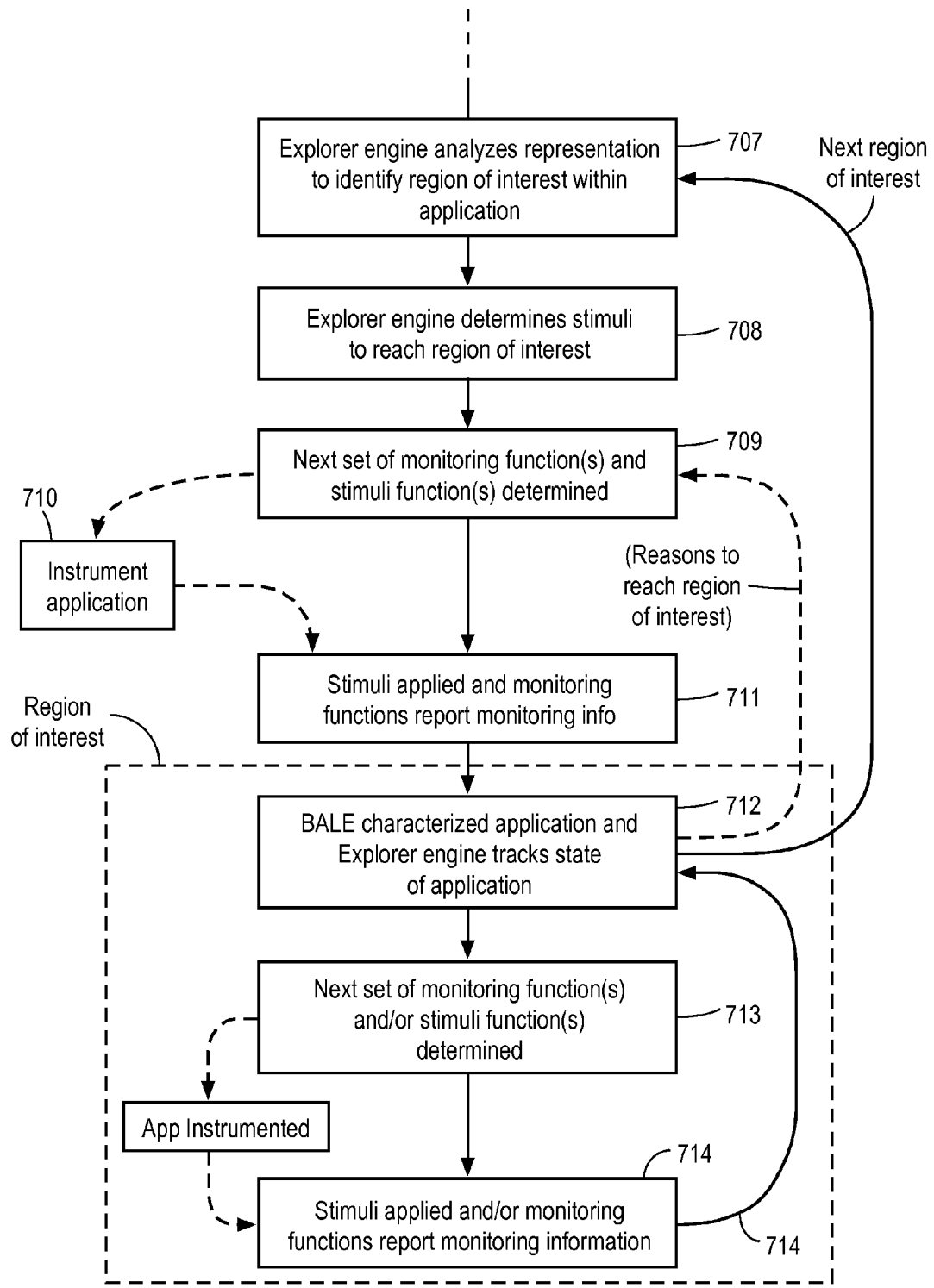

FIG. 7 shows an embodiment of a methodology for the overall framework of FIG. 1. As observed in FIG. 7, an application's code is received and instantiated in a run time environment for execution 701. The application's code is also translated to a higher level code 702. The higher level code is analyzed for purposes of generating a representation of the application that describes states of the application and state transitions of the application 703. The representation of the application is provided to the explorer engine 704. Monitoring functions within the run time environment (which may include monitoring functions instrumented within the application itself), report information to the behavior and logic engine and/or explorer engine as the application is executing 705. The behavior and logic engine uses the reported information to characterize the application's behavior and the explorer engine uses the reported information to track the state of the application 706.

The explorer function also analyzes the application representation and, based on characterization information from the behavior and logic engine and/or one or more hard coded rules, machine learned rules and/or user provided rules, identifies a region of interest within the application 707. The explorer engine determines stimuli that can be applied to the application to drive its execution to the region of interest 708. Based on the identified region of interest and/or the determined stimuli, the explorer and/or behavior and logic engine determine what monitoring and stimuli functions (and associated stimuli) should be enabled 709. This may optionally include instrumenting the application itself with additional monitoring and/or stimuli functions 710.

The determined stimuli are applied and the enabled monitoring functions report respective monitoring information 711. The behavior and logic engine uses the reported information to characterize the application's behavior and the explorer engine uses the reported information to track the state of the application 712. New stimuli and/or monitoring functions may be determined (which may require additional instrumentation of the application itself) that are enabled and/or otherwise applied 713. The process repeats until the region of interest is reached and characterized as safe or unsafe 714. Upon the region of interest having been characterized as safe or unsafe, the explorer function re-analyzes the representation 707 to determine a next region of interest. When all identified regions of interest are identified the coverage analysis of the application is complete.

Although not shown in FIG. 7 (for simplicity), in an embodiment, the framework is also able to "back out" of its current analysis of a specific region of interest to redefine region(s) of interest and/or jump to another region of interest (e.g., because a newly suspected region of interest takes priority over the current region of interest).

Referring back to FIG. 1, along with or apart from the customer provided rules 107, the behavior and logic engine 103_1 and/or explorer engine 103_2 may refer to hardcoded rules 128 and/or machine learned rules 106.

Hardcoded rules 128 typically provide generic or well known/public rules and/or rules that have been written manually. For example, certain viruses and other forms of misbehavioral code have signatures or other behaviors/features that are widely known and rules to address them can be scripted by humans. For example, rules that encapsulate the signature or behavior of a well known "trojan horse" virus may be hand written and added to database 104. Here, for example, database 104 is a store that keeps rules for all known forms of mis-behaving code and/or handwritten rules. Upon bring-up of the framework 101, these rules 128 are made accessible to the framework. Typically, the hard coded rules 128 are not provided by the user but are instead largely created or otherwise accessed by a software security entity (e.g., a corporation that provides software security products) that provides the framework of FIG. 1.

In a further embodiment, database 104 also provides platform specific information to the monitoring functions and/or stimuli functions which are themselves generically written. For example, in an embodiment, the OS monitoring function is originally written around a set of generic OS calls (e.g., save file, read file, etc.). These generic calls, however, have specific forms in a particular environment/platform (e.g., an iOS "save file" call has a certain syntax that is different than the syntax of an ANDROID "save file" call). Database 104 therefore additionally provides platform specific information for the generic monitoring functions so they can detect events within a particular environment/platform. Similarly, database 104 additionally provides platform specific information for generic stimuli functions that are used to generate stimuli that are particular to a specific environment/platform (e.g., a generic event generated according to its specific iOS form or ANDROID form).

In the case of the machine learning function 105 and rules generated therefrom 106, as is known in the art, multiple (e.g., millions of) software instances and/or environments, some of which may be similar to the application 108 being observed, many of others of which may be nothing like the application 108 being observed, have been previously "studied" (e.g., over the course of years) by a machine learning system 105 that has deduced from its observations of these software instances/environments that certain behaviors can be characterized as improper and reduced to a set of rules which are then provided in rule set 106. For example, a machine learning system 105 could be trained on email messages to learn to distinguish between malware code and non-malware code. After this learning, it can then establish a set of rules that classify code as either malware or non-malware.

In general, a machine learning system 105 will typically be given a task (e.g., identify malware) and gain experience attempting to satisfy that task with commensurate feedback as to its successes and failures. Over time, with automated modification to the manner in which attempts to accomplish the task, the machine learning system 105 may recognize improvement in its ability to accomplish the task. In this sense, the machine can be said to have learned. Eventually, e.g., if its success in accomplishing the task crosses some threshold of success, the machine learning system 105 may identify rules for rule set 106 that essentially "educate" the framework of FIG. 1 with whatever the machine learning system 105 has so far learned.

Because of the automated nature of machine learning, the machine learning system 105 can have a massive history of experience in terms of the number of software instances and environments it had observed and the amount of time over which it has been able to observe them. Here, the machine learned rules 106 provide details as to the specific behaviors of various improperly behaving forms of code that used by the behavior and logic engine 103_1 to determine whether the application's behavior corresponds to such mis-behavior. Additionally, the machine learned rules 106 may provide details as to specific low level code structures of improperly behaving code that are used by the explorer engine 103_2 to identify "regions of interest" within the application.

Figure 8:
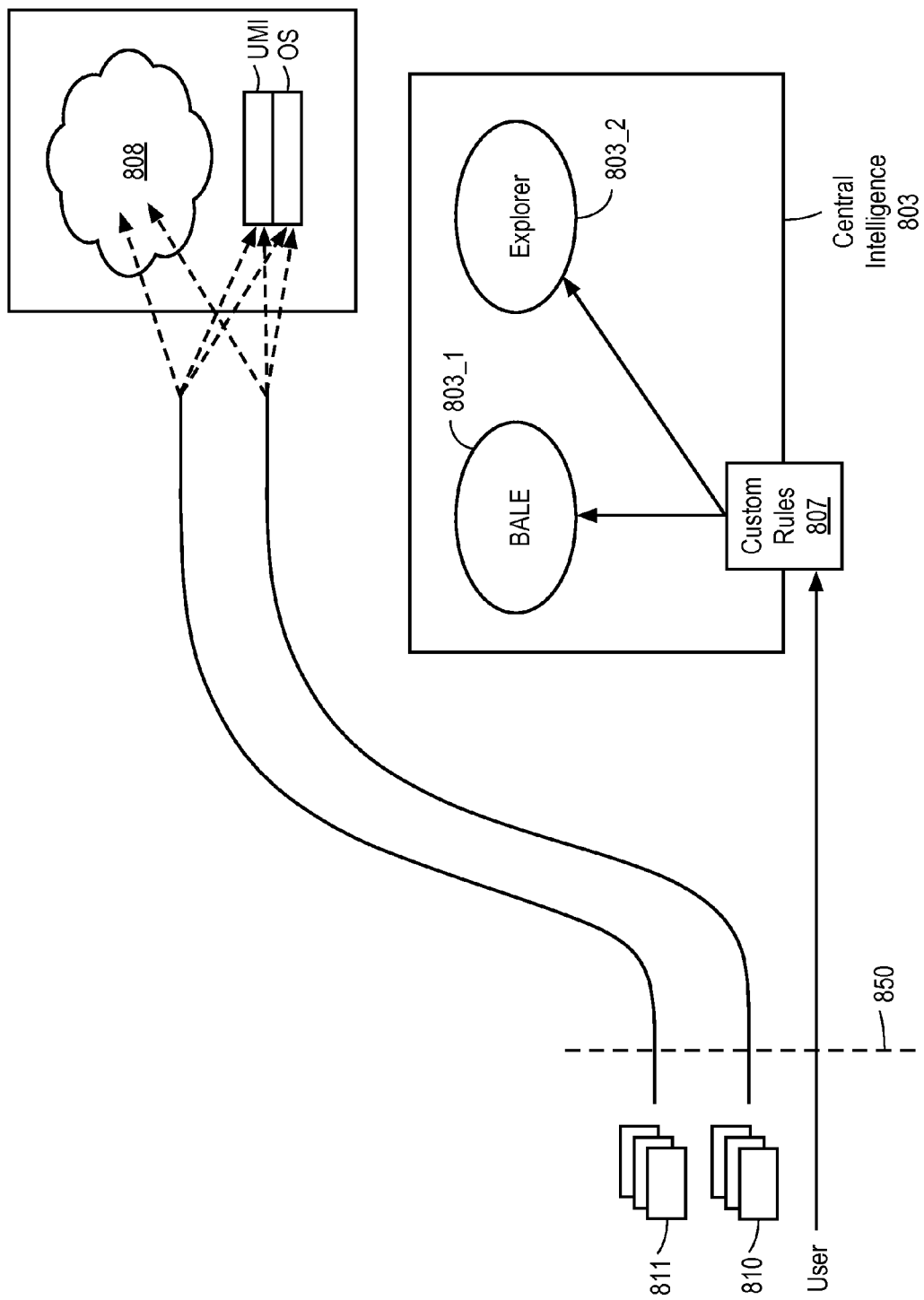
FIG. 8 pertains to a user interface to the framework of FIG. 1.

FIG. 8 provides more details concerning the user experience of the system described above. As observed in FIG. 8, a user interface 850 permits a user to provide one or more custom rules 107, 807 for an application to be analyzed. That is, the rules can be custom crafted by the user for the particular application to be analyzed. Here, a user is any entity that seeks to analyze an application. For example, the user may be the IS department of a large corporation that seeks to ensure that the mobile applications that are installed on their corporate smartphones do not contain improperly behaving code. A user interface is essentially the set of functions that are presented to a user that enables a user to use the system of FIG. 1.

The custom rules 107, 807 are entered through the user interface 850 and incorporated into the set of rules that are referred to by the behavior and logic engine 103_1, 803_1 and explorer engine 103_2, 803_2 of the central intelligence engine 103, 803 discussed at length in the preceding discussion(s).

In a typical scenario, the user rules will identify sensitive items of data that are operated on or otherwise processed by the application being analyzed. For example, if the mobile application is designed to operate on information from a corporate database, the custom rules 807 will identify sensitive items of information from the database (e.g., confidential and/or highly confidential information). In response to these rules, possibly in combination with other rules or input by the behavior and logic engine 803_1, the explorer engine 803_2 will identify as a "region of interest" any application code that operates on this information and cause execution of the application to be brought to any such region of interest.

The behavior and logic engine 803_1 will understand acceptable versus unacceptable uses of this information by the application and monitor the application's use of the information accordingly. For example, the behavior and logic engine 803_1 may cause the application or its underlying platform in the runtime environment to perform data tracking on the information. Upon data tracking being enabled for one or more of the sensitive data items and the application having moved its execution to regions of interest that use the information (through the influence of the explorer engine 803_2), the behavior and logic engine 803_1 will track locations where the data is actually stored and/or sent and compare these locations against acceptable register, system memory and non volatile memory storage locations where the sensitive information can be stored as well as acceptable network destinations (e.g., network address locations) where the information can be sent. These acceptable storage and/or network address locations may be defined partially or entirely by the user through the user interface 850 (likewise, unacceptable storage locations and/or network destinations may also be identified).

Alternatively or in combination, because data tracking may involve low level insight into the application, the explorer engine may likewise be configured to detect improper low level movements of the data via detected improper state transitions within the application. Definitions of such improper movements/transitions may additionally be provided to the explorer engine by the user through the custom user rules 807

In another typical scenario, the user identifies improper behaviors (e.g., an attempt to engage in a communication session with a particular location, machine or database within a protected corporate intranet or attempts to access information within a protected or private region of system memory and/or register space of the application's run time environment). Again, the explorer engine 803_2 can attempt to identify regions of code that will perform the user identified improper action and bring the application's execution to such code. Either or both of the explorer engine 803_2 and behavior and logic engine 803_1 cause the application to be monitored appropriately. The explorer engine 803_2 causes the application's execution state to be brought to the region of interest and the behavior and logic engine 803_1 receives the monitoring data, implements further points of analysis and ultimately reaches a conclusion whether the region of interest is malicious. If the improper behaviors are defined at the application state transition level, the explorer engine can detect such improper behavior as well and report it to the behavior and logic engine.

As observed in FIG. 8, an application 808 and/or its operating environment can also be retro-fitted with various plug-ins 810, 811. Here, plug-in 810 corresponds to one or more publically available plug-ins, and, plug-in 811 corresponds to one or more mobile device management (MDM) plug-ins. A plug-in is essentially program code that implements an additional set of functions to the main application and/or its underlying operating platform (such as its virtual machine or operating system) 808. For example, an application 808 or operating system may receive a plug-in to process a new type of file format or perform a new function. In the later case, a new GUI feature may appear after installation of the plug-in.

Publically available plug-ins are often downloaded from the Internet. They may be procured or free. MDM plug-ins may be publically available or may be private code. They are typically used to manage the software environment of a smartphone or other mobile device. For example, with an MDM plug-in an IS department may be able to remotely configure, monitor, install/un-install and/or enable or disable, various functions and/or software applications on any of its issued smartphones.

Here, through the user interface 850 a user is able to plug-in any such plug-in to the application before it is submitted to the static instrumentation engine 801 for translation and representation generation. Here, the representation generation function generates a representation of the application with any of the plug-ins that the user has defined should be plugged into the application.

Figure 9:
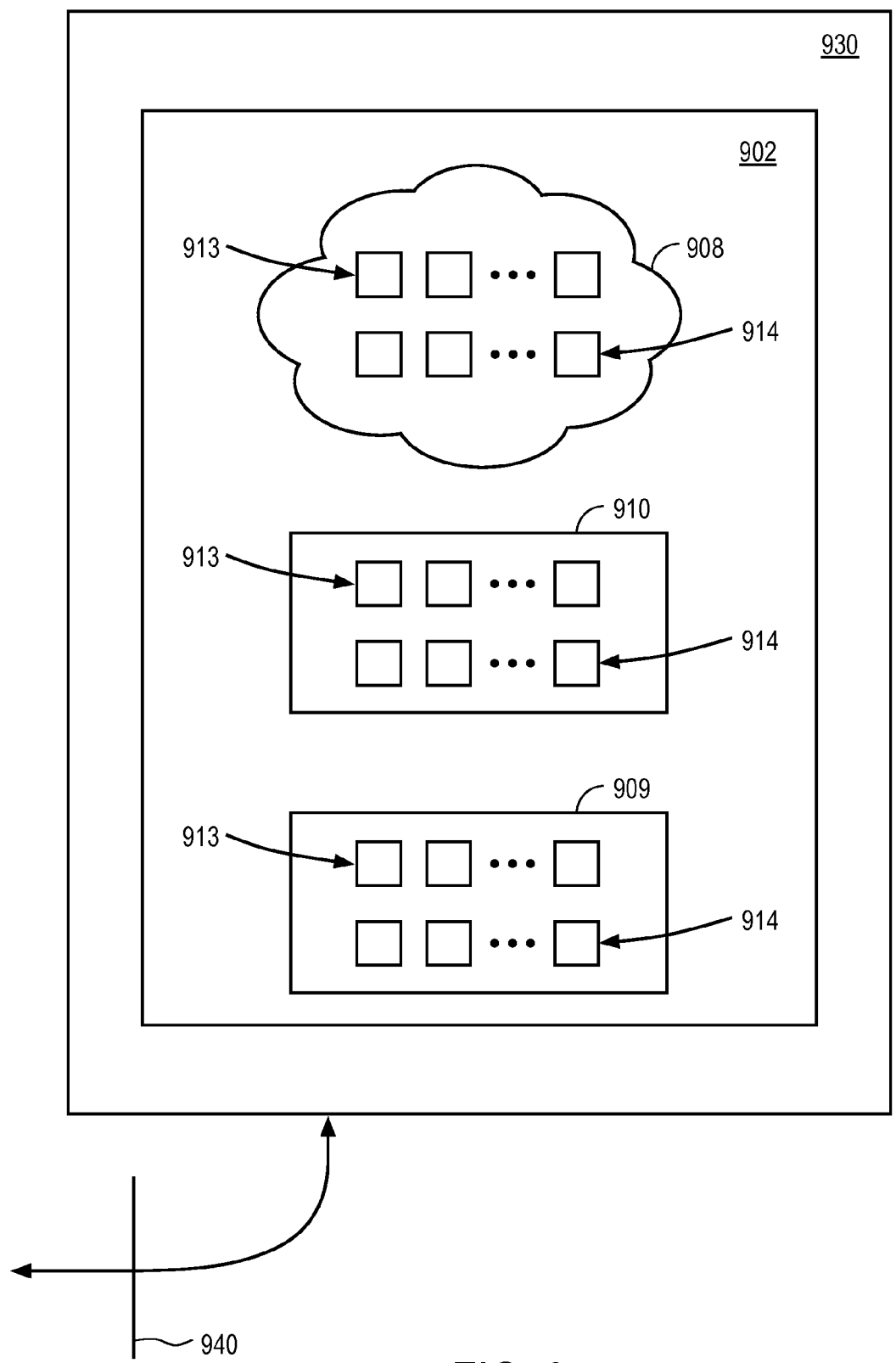
FIG. 9 pertains to charactering an application while it is installed on a mobile device.

Applications may also be analyzed on their respective devices. In the case of a typical smartphone, which does not contain a large scale virtual machine monitor layer, the runtime environment discussed above with respect to FIG. 2 (showing multiple concurrent application instances executing on a virtual machine monitor layer) may not be applicable. Instead, the runtime environment will be as observed in FIG. 9. FIG. 9 is similar to FIG. 5, except that lower (second) virtual machine layer is missing.

Here, feature 930 corresponds to an actual mobile device and run time environment 902 corresponds to the run time environment of the mobile device 930. The aforementioned possibilities for the locations and functions of various monitor functions 913 and stimuli functions 914 are as discussed in the applicable preceding sections above. In some implementations, a user may not have the ability to change, modify, re-install or replace the virtual machine layer 910 or operating system 909 in the device 930, in which case, all monitors and stimuli functions may be located within the application 908 by way of instrumentation.

In a typical usage case, a device 930 with an application 908 is communicatively coupled to the overall framework depicted in FIG. 1 through an interface 940 to the framework. The coupling may take various forms such as wireless and/or hardwired. The wireless communication may be over any wireless network (e.g., WWAN or WLAN) or wireless point-to-point link (e.g., Bluetooth).

In the case of typical network connectivity, applications may be screened for safety on mobile devices that are "in the field". For instance, as just one example, an application may be installed for actual use on mobile device that is active in the field but the application has been fully instrumented with all monitoring and stimuli functions. Should a need arise to confirm that the application is still safe while it is in the field (e.g., because of a suspicious event or as matter of periodic check-ups), the rest of the framework can communicate with these instrumented functions as well as any monitoring and/or stimuli functions that were embedded into the software layers beneath the application (e.g., virtual machine, operating system) before the device was released into the field for actual use. With any standard communication session between the device and the framework (e.g., over the Internet) the application can be fully screened. That is, monitors can send their respective monitoring information over the network to the framework and the framework can send commands to the stimuli functions and monitors over the network. Thus the application itself can be screened while it is Hardwired communicative coupling may be achieved through the mobile device's standard hardware I/O interface (e.g., a USB interface). Here, commands to the monitoring functions 913 and stimuli functions 914 are submitted by the framework to the mobile device 930 through the interface 940. Likewise, information from the monitoring functions 913 are reported to the framework through the interface.

In the case of instrumentation of the application 908, an instrumented application is created according to the processes discussed above in preceding sections and installed on the mobile device 930. If an instrumented application 908 that is installed on the device 930 needs to be instrumented with additional monitoring and/or stimuli functions, in an embodiment, the state of the application 908 is externally saved (e.g., through the interface 940 and into storage associated with the framework), a new instance of the application having the new instrumentation set is created and installed on the device 930. The application state is then reloaded onto the mobile device through the interface 940 and analysis of the application continues. Alternatively, the application state could conceivably be stored on the mobile device 930 rather than being externally stored. Further still, in an embodiment, because of possible difficulties associated with the saving of state information of an application that is installed on a mobile device, as a default, an application to be analyzed may be fully instrumented with a complete suite of monitors and stimuli functions before its initial installation on the mobile device. In this case, no new instance of the application 908 with additional instrumentation would ever need to be created.

Apart from analyzing an application, the framework discussed above may also be used to modify application software so as to specifically prevent it from improper behavior. Here, the instrumentation unit 414 discussed above serves to insert additional code into an application so that it is specifically prevented from performing unwanted actions. As just one example, an application may be retrofitted with software that prevents certain, specific sensitive information from being transmitted from the smartphone that the application will be installed on.

Figure 10:
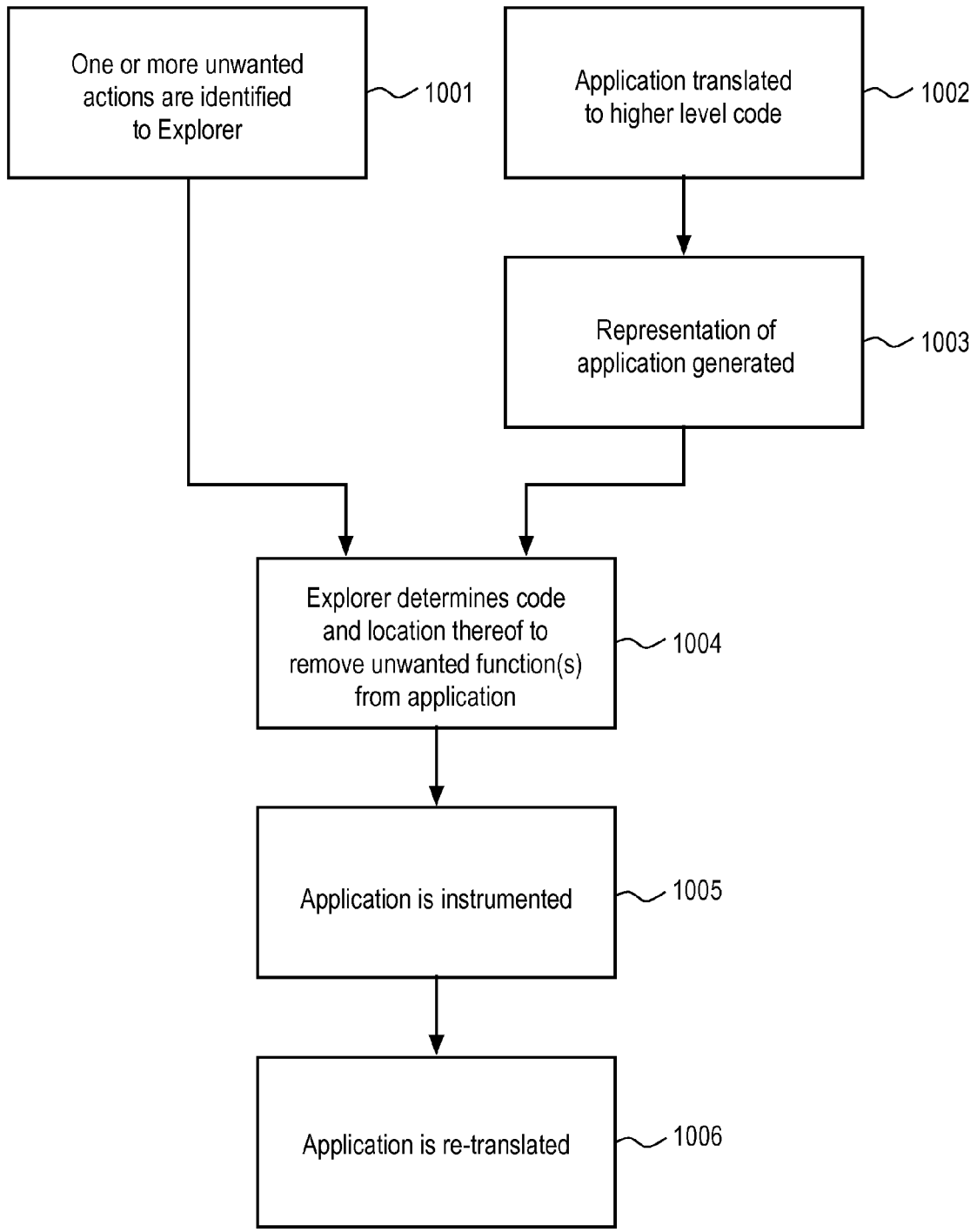
FIG. 10 pertains to instrumenting applications to effect security policies in the field.

FIG. 10 shows an embodiment of a method flow for instrumenting an application so as to prevent it from performing unwanted actions. As observed in FIG. 10, one or more unwanted actions are identified and presented to the explorer component 1001.

The application is then translated by the application translation unit 414 to, e.g., create a higher level object code instance of the application 1002. A representation of the application, such as a control flow graph or other structure that describes the application's states and state transitions is created by the application representation generation unit 415 from the abstracted application instance and submitted to the explorer component 1003.

The explorer component studies the specified unwanted action(s) to be prevented and the code's representation and defines changes to be made to the application's code to remove from the application any ability to perform the unwanted action(s) 1004. For example, if the unwanted action is the sending of certain sensitive information outside the application, the explorer may define all possible "exit points" of information from the application. The explorer may further determine that a data monitoring function is to be embedded in the application that is configured to track the information. The explorer may further determine that additional code needs to be added to the application that will prevent the execution of any exit point if it uses information from a tainted source (e.g., a tainted register location, system memory location and/or non volatile storage location). Alternatively or in combination the explorer may simply remove certain blocks of code from the application in order to remove the unwanted function from the application.

The explorer's determinations are then communicated to the instrumentation unit which instruments the application with code designed to effect the functions mandated by the explorer 1005. The application is then retranslated to its original code level by the re-translator 417 and installed on a mobile device 1006.

The types of unwanted behaviors that can be specified and prevented through the instrumentation process described above are too numerous to detail in full here. However, some basic applications of the above described sequence are discussed immediately below.

In a first embodiment, certain device functions are disabled. For example, the audio function (e.g., the ability of an application to "turn-on" the microphone of a mobile device so it can internally process the audio information near it (such as a conversation)) of a mobile device may be disabled. According to one approach, the explorer determines any states within the application that could cause a command to be sent to the hardware and/or OS to turn on the device's audio function and determines that such states should be modified to remove or otherwise squelch this ability.

In a further embodiment, the disablement of the function is made conditional. For example, the specific unwanted behavior may be that the audio device should be disabled whenever the device is within range of a certain wireless network, out of range of a certain wireless network, whenever the device is within one or more specific GPS location(s) or outside one or more specific GPS location(s). Here, the instrumentation code that disables the audio is written to only take effect if the stated condition is detected. To support this ability, the explorer identifies the parts of the application code that are sensitive to the conditions needed to determine whether to enable/disable the function. Apart from an audio device, a network interface, camera or video device may similarly be disabled as discussed above.

In a second embodiment, an application's ability to engage in communication with an external system (e.g., a packet exchange with another computer over a network) is tightly controlled. Here permissible and/or unwanted actions may be specified such the external communication is permitted only through specific networks, not permitted over specific networks or types of networks (e.g., public networks), permitted only with specific systems (e.g., servers or other computers), not permitted with specific systems or types of systems.

In a third embodiment, an application's ability to access data, either external from the mobile device or internal to the mobile device is tightly controlled. For example, network communications/sessions with specific external computing systems may be prevented, and/or access to certain files or system memory regions within the mobile device may be prevent.

Figure 11A:
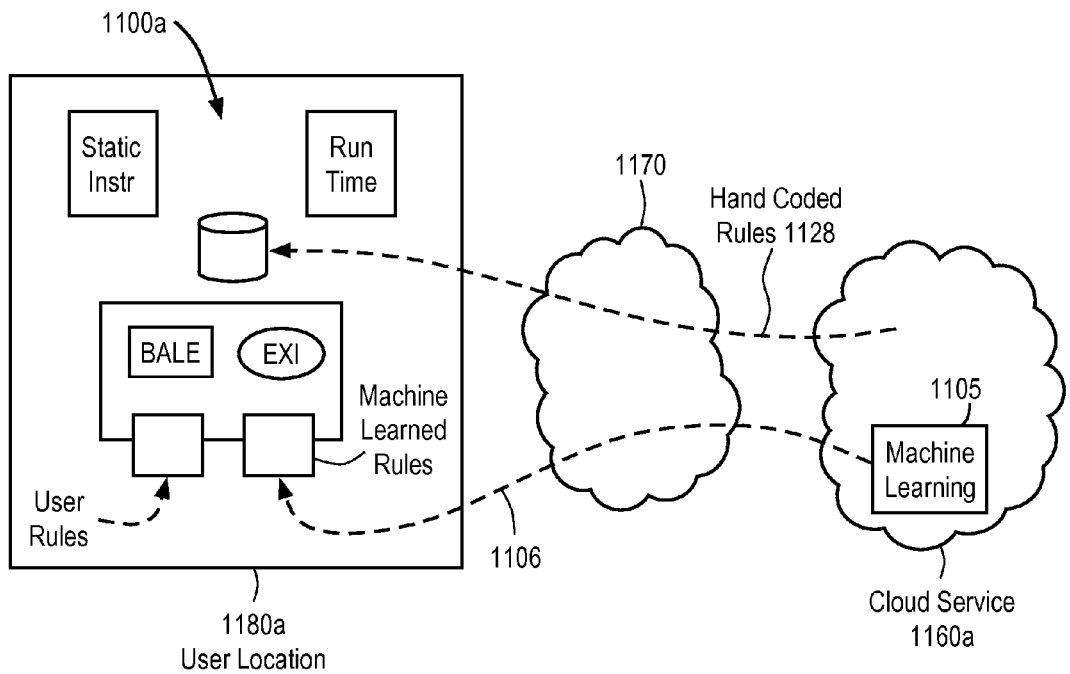
FIGS. 11a and 11b pertain to different use cases of the framework of FIG. 1.
Figure 11B:
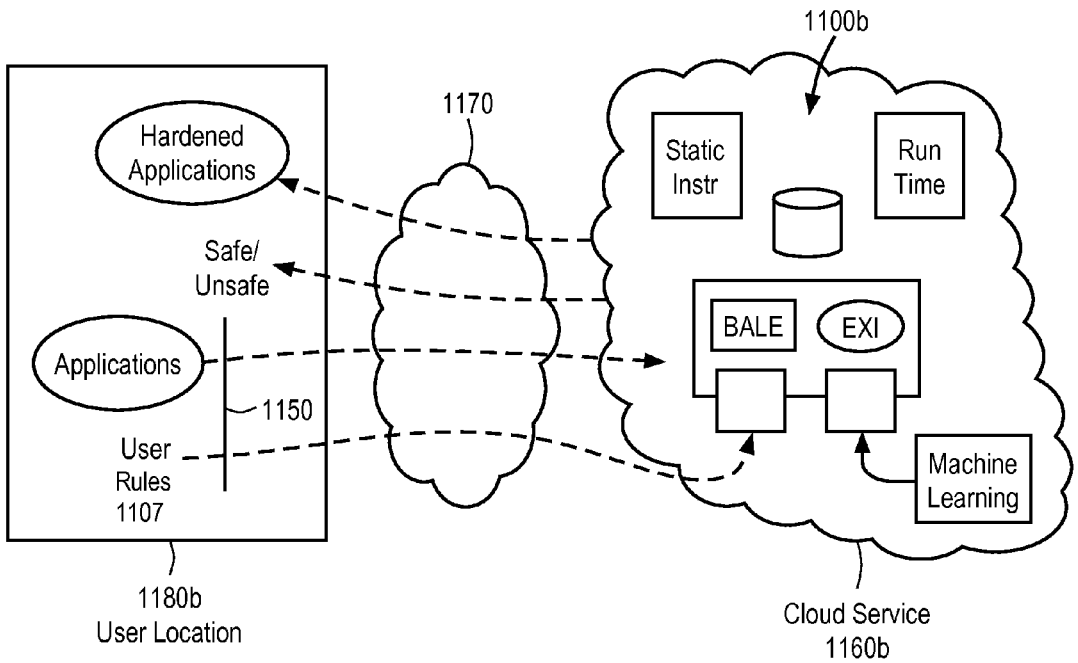

FIGS. 11a and 11b show various uses of the framework 100 of FIG. 1. As observed in FIG. 11a, most of the entire framework 1100a is implemented at a user's location 1180a, such as by an IS department of a large corporation. Here, for instance, the large corporation issues mobile devices to its employees and desires that the applications that run on these devices be safe. The IS department of the corporation therefore maintains the framework at its own location so it can screen the corporation's application software on its own premises 1180a. Notably, however, the machine learned rules 106 and at least some of the hard coded rules 1128 are provided by a cloud service 1160a that is separated from the framework by a network 1170 (e.g., the Internet). Here, cloud service 1160a may be provided, for example, by a security software company that initially provided the framework to the corporation. Over time, the rules 1106, 1128 are updated as the service provider generates more rules. Note the machine learning 1105 part of the framework resides in the cloud service 1160a in this instance.

FIG. 11b shows another use case where the entire framework 1100b is implemented as a cloud service. Here, the user or customer submits an application and any user rules 1107 through interface 1150 at user location 1180b and over network 1170 to the cloud service 1160b. The cloud service 1160b then performs safety screening on the application.

Other usage models of the framework are also possible where various parts of the framework (other than just the machine learning and hard coded rules portions as in FIG. 11a or the entire framework as in FIG. 11b) are provided as a cloud service 1160a of FIG. 11a or cloud service 1160b of FIG. 11b.

Other usage models may direct applications for screening to the framework (however it is implemented) as part of their normal download and installation process. For example a user may chose to download an application from the Internet, however, before the application is allowed to be downloaded and installed on the user's device it is instead routed to the framework which analyzes it. Here, the application is only permitted to be installed on the device if it is deemed safe by the framework.

Although the above discussion has been directed to the security analysis of application software on mobile devices, it is pertinent to point out that the above described framework could also be applied to application software to larger systems such as a personal computers (e.g., laptop and desktop systems) and server systems.

The various components of the framework described above can be performed on any number of computing systems. At one extreme all of the components of the framework 100 could be implemented on a single computing system (e.g., on a large server system). Alternatively, each of the components of the framework could be implemented on its own respective computer system apart from the other framework components and their respective computer systems. A single framework component could be implemented with multiple computer systems. A single computer system could contain some but not all of the components of the framework. A single framework component may be implemented on more than one computing system. Different combinations of various ones of these possibilities may be used to create a single framework. To the extent different computing systems are used to implemented the framework they may be communicatively coupled with one or more networks.

Processes taught by the discussion above may be performed with program code such as machine-executable instructions which cause a machine (such as a "virtual machine", a general-purpose CPU processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

A storage medium may be used to store program code. A storage medium that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 12:
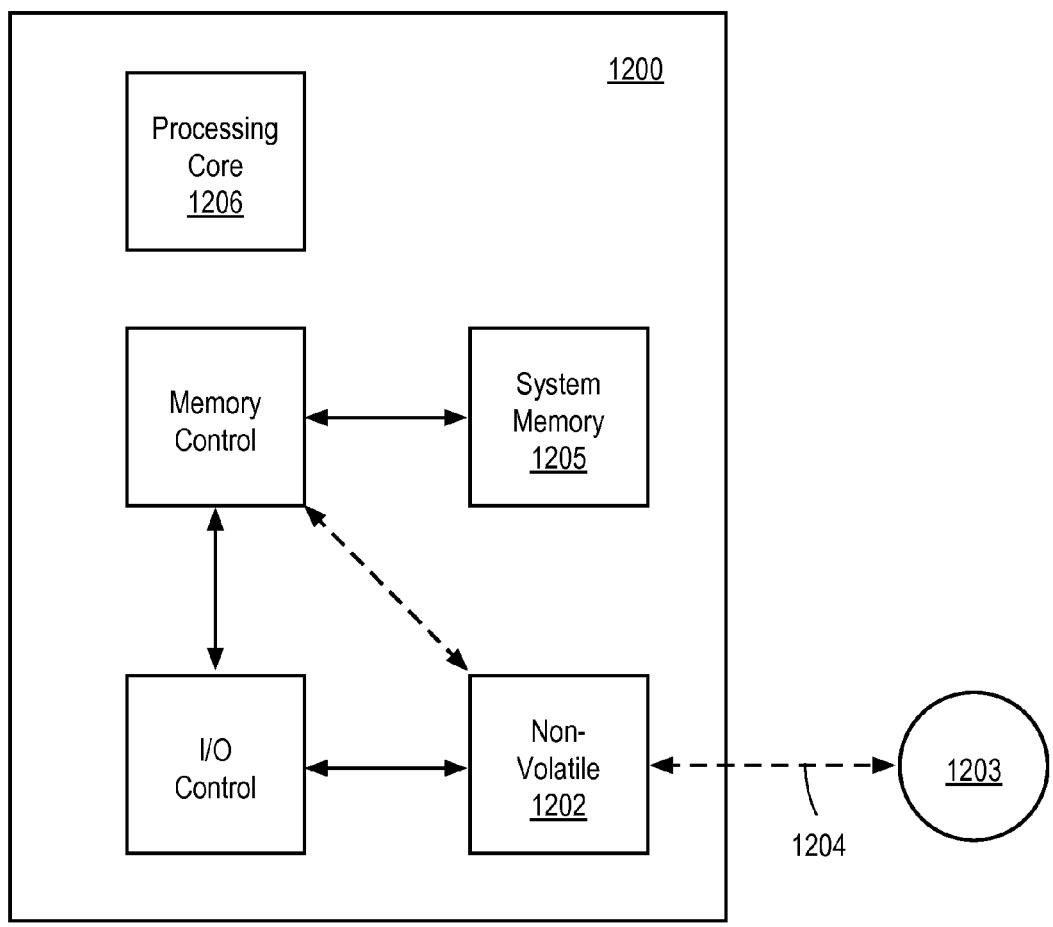
FIG. 12 provides an embodiment of a computer system.

FIG. 12 is a block diagram of a computing system 1200 that can execute program code stored by a storage medium. It is important to recognize that the computing system block diagram of FIG. 12 is just one of various computing system architectures. Different types of computing systems include mobile and/or handheld computing devices (e.g., smartphones, cell-phones, personal digital assistances), laptop personal computers, desktop personal computers, servers, etc.

The applicable storage medium may include one or more fixed components (such as non volatile storage component 1202 (e.g., a hard disk drive, FLASH drive or non volatile memory) or system memory 1205) and/or various movable components such as a CD ROM 1203, a compact disc, a magnetic tape, etc. operable with removable media drive 1204. In order to execute the program code, typically instructions of the program code are loaded into the Random Access Memory (RAM) system memory 1205; and, the processing core 1206 then executes the instructions. The processing core 1206 may include one or more CPU processors or CPU processing cores.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   instrumenting, by a static instrumentation engine within software executed by a processor, an application of a handheld computing device with one or more monitoring functions, at least one of the one or more monitoring functions operating in a run time environment during virtual execution of the instrumented application;
   tracking, by the one or more monitoring functions, movement of data associated with the application, the data being at least partially identified by a storage location;
   determining whether movement of the data from a first storage location to a second storage location is suspicious; and
   reporting suspicious movement of the data.

2. The method of claim 1, wherein the first storage location and the second storage location are memory locations.

3. The method of claim 1, wherein the first storage location and the second storage location are register locations.

4. A method comprising:
   instrumenting an application of a mobile device with one or more monitoring functions, at least one of the one or more monitoring functions operating in a run time environment during virtual execution of the instrumented application;
   tracking, by the one or more monitoring functions, movement of data associated with the application, the data being at least partially identified by a storage location, the tracking of the movement of the data comprises determining, during the virtual execution of the instrumented application, whether the instrumented application is attempting to cause the data to be directed out of the run time environment;
   determining whether the tracked movement of the data is suspicious; and
   reporting suspicious movement of the data.

5. A method comprising:
   instrumenting an application of a mobile device with one or more monitoring functions, at least one of the one or more monitoring functions operating in a run time environment during virtual execution of the instrumented application;
   tracking, by the one or more monitoring functions, movement of data associated with the application, the data being at least partially identified by a storage location, the tracking of the movement of the data comprises determining, during the virtual execution of the instrumented application, whether the instrumented application is attempting to send the data over a network connection;
   determining whether the tracked movement of the data is suspicious; and
   reporting suspicious movement of the data.

6. The method of claim 1, wherein the determining whether movement of the data from the first storage location to the second storage location is suspicious comprises (1) identifying that the data is sensitive and (2) identifying that the second storage location is different than any of a plurality of storage locations permitted to store sensitive data.

7. The method of claim 1, wherein the identifying that the data is sensitive comprises identifying whether the data is maintained within an entry of a table that is identified as corresponding to a register or system address that is storing sensitive data.

8. The method of claim 1, wherein the determining whether movement of the data from the first storage location to the second storage location is suspicious comprises detecting an attempt by the application to store the data in the second storage location that corresponds to a storage location that is not permitted to store sensitive information.

9. The method of claim 1, wherein the reporting of the suspicious movement of the data comprises sending a report to a central intelligence engine that controls a testing strategy for the application.

10. The method of claim 1, wherein the determining whether movement of the data from the first storage location to the second storage location is suspicious and the reporting of the suspicious movement is conducted by the one or more monitoring functions.

11. The method of claim 1, wherein determining whether movement of the data from the first storage location to the second storage location is suspicious comprises identifying an attempt by the application to direct data outside the run-time environment.

12. The method of claim 1, wherein determining whether movement of the data from the first storage location to the second storage location is suspicious comprises identifying an attempt by the application to direct data to an unapproved storage location.

13. A system comprising:
   a processor; and
   a memory coupled to the processor, the memory comprises
   a static instrumentation engine that, when executed by the processor, is configured to instrument an application with one or more monitoring functions;
   a dynamic run time environment that, when executed by the processor, is configured to conduct virtual execution of the instrumented application where one or more monitoring functions tracking movement of data within the instrumented application that is determined to be a suspicious activity in response to determining, by the one or more monitoring functions during virtual execution of the instrumented application, that the instrumented application is attempting to cause the data to be directed out of the dynamic run time environment; and a central intelligence engine that, when executed by the processor, is configured to receive a report indicating the determined suspicious activity.

14. The system of claim 13, wherein the dynamic run time environment comprises one or more virtual machines to conduct virtual execution of the instrumented application and a virtual machine monitor that is responsible for allocating hardware resources of the system to the one or more virtual machines.

15. The system of claim 13, wherein the hardware resources comprises storage space within a non-volatile memory.

16. The system of claim 13, wherein the one or more monitoring functions tracking movement of the data by determining, during virtual execution of the instrumented application, whether the instrumented application is attempting to cause the data to be directed out of the dynamic run time environment by sending the data over a network connection.

17. A system comprising:
a processor; and
a memory coupled to the processor, the memory comprises
a static instrumentation engine that, when executed by the processor, is configured to instrument an application with one or more monitoring functions;
a dynamic run time environment that, when executed by the processor, is configured to conduct virtual execution of the instrumented application where one or more monitoring functions tracking movement of data within the instrumented application that is determined to be a suspicious activity, the dynamic run time environment determining whether movement of the data is suspicious activity by (1) identifying that the data is sensitive and (2) identifying that the second storage location is different than any of a plurality of storage locations permitted to store sensitive data; and
a central intelligence engine that, when executed by the processor, is configured to receive a report indicating the determined suspicious activity.

18. A system comprising:
a static instrumentation engine configured to instrument an application with one or more monitoring functions;
a dynamic run time environment configured to conduct virtual execution of the instrumented application where one or more monitoring functions tracking movement of data within the instrumented application that is determined to be a suspicious activity, the dynamic run time environment determining whether movement of the data is suspicious activity by identifying an attempt by the instrumented application to direct data to an unapproved storage location; and
a central intelligence engine configured to receive a report indicating the determined suspicious activity.

19. The method of claim 4, wherein the determining whether the instrumented application is attempting to cause the data to be directed out of the dynamic run time environment comprises determining whether the instrumented application is attempting to send the data over a network connection.

20. The method of claim 4, wherein the reporting of the suspicious movement is conducted by the one or more monitoring functions.

21. The method of claim 4, wherein the determining whether movement of the data from the first storage location to the second storage location is suspicious is conducted by the one or more monitoring functions during virtual execution of the application.

22. The system of claim 17, wherein the dynamic run time environment comprises one or more virtual machines to conduct virtual execution of the instrumented application and a virtual machine monitor that is responsible for allocating hardware resources of the system to the one or more virtual machines.

23. The system of claim 22, wherein the hardware resources comprises storage space within a non-volatile memory.

24. The system of claim 18, wherein the dynamic run time environment comprises one or more virtual machines to conduct virtual execution of the instrumented application and a virtual machine monitor that is responsible for allocating hardware resources of the system to the one or more virtual machines.

25. The system of claim 24, wherein the hardware resources comprises storage space within a non-volatile memory.

26. A system comprising:
a processor; and
a memory coupled to the processor, the memory comprises
a static instrumentation engine that, when executed by the processor, is configured to instrument an application with one or more monitoring functions;
a dynamic run time environment communicatively coupled to the static instrumentation engine, the dynamic run time environment that, when executed by the processor, is configured to (i) conduct virtual execution of the instrumented application where one or more monitoring functions tracking movement of data within the instrumented application that is determined to be a suspicious activity in response to determining, by the one or more monitoring functions during virtual execution of the instrumented application, that the instrumented application is attempting to cause the data to be directed out of the dynamic run time environment, and (ii) output information that identifies the determined suspicious activity.

27. The system of claim 26 further comprising a central intelligence engine communicatively coupled to the static instrumentation engine, the central intelligence engine to receive a report indicating the determined suspicious activity.

28. The system of claim 27, wherein the dynamic run time environment comprises one or more virtual machines to conduct the virtual execution of the instrumented application and a virtual machine monitor that is responsible for allocating hardware resources of the system to the one or more virtual machines.

29. The system of claim 27, wherein the one or more monitoring functions of the application are enabled or disabled by the central intelligence engine and one or more monitoring functions within the one or more virtual machines are enabled or disabled by the central intelligence engine.

30. The system of claim 26, wherein the hardware resources comprise storage space within a non-volatile memory.

31. The system of claim 26, wherein determining whether movement of the data from the first storage location to the second storage location is suspicious comprises identifying an attempt by the application to direct data outside the run-time environment.

32. The system of claim 26, wherein the one or more monitoring functions tracking movement of the data by determining, during virtual execution of the instrumented application, whether the instrumented application is attempting to send the data over a network connection.

33. The system of claim 26, wherein the dynamic run time environment comprises one or more virtual machines to conduct the virtual execution of the instrumented application and a virtual machine monitor that is responsible for allocating hardware resources of the system to the one or more virtual machines.

\* \* \* \* \*